US012249259B2

(12) United States Patent
Kim et al.

(10) Patent No.: US 12,249,259 B2
(45) Date of Patent: Mar. 11, 2025

(54) ROLLABLE DISPLAY DEVICE WITH EXTENDING ARMS AND FIXING BAR

(71) Applicant: Samsung Display Co., Ltd., Yongin-si (KR)

(72) Inventors: Youngsam Kim, Yongin-si (KR); Jin Hwan Choi, Seoul (KR); Taewoong Kim, Seongnam-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 82 days.

(21) Appl. No.: 17/670,886

(22) Filed: Feb. 14, 2022

(65) Prior Publication Data

US 2022/0262281 A1 Aug. 18, 2022

(30) Foreign Application Priority Data

Feb. 15, 2021 (KR) ........................ 10-2021-0019946

(51) Int. Cl.
*G06F 1/16* (2006.01)
*G09F 9/30* (2006.01)

(52) U.S. Cl.
CPC .................................... *G09F 9/301* (2013.01)

(58) Field of Classification Search
CPC ..... G06F 1/1652; H04M 1/0268; G09F 9/301
See application file for complete search history.

(56) References Cited

U.S. PATENT DOCUMENTS

| | | | | |
|---|---|---|---|---|
| 8,031,400 B2 * | 10/2011 | Wang | G03B 21/58 359/461 |
| 8,199,471 B2 | 6/2012 | Bemelmans et al. | |
| 9,940,892 B2 | 4/2018 | Pang | |
| 10,506,726 B2 * | 12/2019 | Kang | H10K 77/111 |
| 10,588,223 B2 | 3/2020 | Han et al. | |
| 10,777,102 B2 * | 9/2020 | Cho | G06F 1/1652 |
| 10,789,863 B2 * | 9/2020 | Song | H05K 1/189 |
| 10,877,525 B2 * | 12/2020 | Kang | G06F 1/1601 |
| 10,890,947 B2 * | 1/2021 | Choi | G09F 9/301 |
| 11,057,707 B2 * | 7/2021 | Kim | H04R 9/045 |
| 11,064,300 B2 * | 7/2021 | Kim | H04R 17/00 |
| 11,553,278 B2 * | 1/2023 | Kim | H04R 7/04 |
| 11,553,610 B2 * | 1/2023 | Lee | G06F 1/1652 |
| 11,576,270 B2 * | 2/2023 | Rha | G06F 1/1652 |
| 11,706,885 B2 * | 7/2023 | Kim | H05K 5/0017 361/807 |

(Continued)

FOREIGN PATENT DOCUMENTS

| | | |
|---|---|---|
| KR | 10-2017-0006012 | 1/2017 |
| KR | 10-2019509 | 9/2019 |
| KR | 10-2020-0079002 | 7/2020 |

*Primary Examiner* — Rockshana D Chowdhury
*Assistant Examiner* — Douglas R Burtner
(74) *Attorney, Agent, or Firm* — KILE PARK REED & HOUTTEMAN PLLC

(57) ABSTRACT

A display device includes a display module, a roller connected to a first end of the display module, and a first arm and a second arm disposed on a rear surface of the display module, spaced apart from each other, and connected to a second end of the display module. Each of the first arm and the second arm includes joint units coupled to each other and rotatable relative to each other, and a torsion spring disposed in a portion of adjacent ones of the joint units.

19 Claims, 17 Drawing Sheets

(56) References Cited

U.S. PATENT DOCUMENTS

| | | | | |
|---|---|---|---|---|
| 11,755,066 | B2 * | 9/2023 | Chang | G06F 1/1681<br>361/679.01 |
| 2012/0002357 | A1 * | 1/2012 | Auld | G09F 11/30<br>361/679.01 |
| 2016/0374228 | A1 * | 12/2016 | Park | G09F 9/301 |
| 2020/0008309 | A1 * | 1/2020 | Kim | H10K 50/844 |
| 2022/0408574 | A1 * | 12/2022 | Park | H05K 5/0217 |
| 2023/0199981 | A1 * | 6/2023 | Pyo | H02K 7/116<br>361/807 |

* cited by examiner

ROLLABLE DISPLAY DEVICE WITH EXTENDING ARMS AND FIXING BAR

CROSS-REFERENCE TO RELATED APPLICATION(S)

This application claims priority to and benefits of Korean Patent Application No. 10-2021-0019946 under 35 U.S.C. § 119, filed on Feb. 15, 2021, in the Korean Intellectual Property Office, the entire contents of which are incorporated herein by reference.

BACKGROUND

Embodiments of the disclosure described herein relate to a display device.

Electronic devices, such as a smart phone, a digital camera, a notebook computer, a navigation device, a smart television, and the like, which provide an image to a user include a display device for displaying an image. The display device generates an image and provides the generated image to the user through a display screen.

Recently, with the development of display device technologies, various forms of display devices have been developed. For example, various flexible display devices that can be curved, folded, or rolled have been developed. The flexible display devices may be easy to carry and may improve user convenience.

Flexible display panels used in the flexible display devices have an advantage in that the shapes may be modified. However, when the flexible display panels are unfolded, it may be difficult to maintain the flatness. Accordingly, a technology for maintaining the flatness of a flexible display panel needs to be developed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments of the disclosure provide a display device for improving the flatness of a display module and balancing the display module when the display module wound around a roller is unwound from the roller.

According to an embodiment, a display device may include a display module, a roller connected to a first end of the display module, and a first arm and a second arm disposed on a rear surface of the display module, spaced apart from each other, and connected to a second end of the display module. Each of the first arm and the second arm may include joint units coupled to each other and rotatable relative to each other, and a torsion spring disposed in a portion of adjacent ones of the joint units.

According to an embodiment, the first end of the display module and the second end of the display module may be opposite to each other in a first direction. The joint units may be unfolded or folded in the first direction.

According to an embodiment, the torsion spring may apply forces to the joint units such that the joint units are unfolded in the first direction.

According to an embodiment, each of the first arm and the second arm may include rotational coupling portions that rotatably couple the joint units to each other. The torsion spring may surround and may be coupled to at least one of the rotational coupling portions.

According to an embodiment, the torsion spring may include a spring part surrounding the at least one of the rotational coupling portions, the spring part having a helical shape; and an extension portion extending from the spring part toward each of the joint units coupled to the at least one of the rotational coupling portions.

According to an embodiment, the display device may further include a fixing bar connected to the first arm, the second arm, and the second end of the display module, the fixing bar extending in a second direction intersecting the first direction.

According to an embodiment, the display device may further include a balance bar disposed between the first arm and the second arm, and a balance post disposed between the balance post and the fixing bar, the balance post extending in the first direction.

According to an embodiment, each of the first arm and the second arm may further include another portion of adjacent ones of the joint units. The balance bar may be connected to the another portion of adjacent ones of the joint units.

According to an embodiment, the torsion spring may not be disposed in the another portion of adjacent ones of the joint units.

According to an embodiment, the balance bar may include a hole through which the balance post moves in the first direction.

According to an embodiment, the balance post may be extended and retracted in the first direction.

According to an embodiment, the display device may include a support layer disposed on the rear surface of the display module, and a support bar disposed in the support layer.

According to an embodiment, a modulus of the support bar may be higher than a modulus of the support layer.

According to an embodiment, the support bar may include a metal.

According to an embodiment, the display device may include at least one magnet disposed in each of the joint units.

According to an embodiment, the display device may include a driving part that rotates with respect to an axis parallel to a second direction intersecting the first direction, and a belt connecting the driving part to the roller.

According to an embodiment, the display module may be wound or unwound from the roller as the driving part rotates. A rotational force of the driving part may be greater than an elastic force of the torsion spring when the driving part rotates such that the display module is wound around the roller.

According to an embodiment, the display device may include a housing in which the roller, the display module, the first arm and the second arm are disposed. The display module, the first arm, and the second arm may extend to the outside of the housing in case that the display module is unwound from the roller.

According to an embodiment, a display device may include a display module, a roller connected to the display module, the display module being wound around or unwound from the roller, a fixing bar spaced apart from the roller in a first direction and connected to the display module, first joint units disposed on a rear surface of the display module and connected to the fixing bar, the first joint units being folded or unfolded in the first direction, second joint units disposed on the rear surface of the display module and connected to the fixing bar, the plurality of second joint units being folded or unfolded in the first direction and spaced apart from the first joint units in a second direction intersecting the first direction, a balance bar disposed between the first joint units and the second joint units, and a balance post disposed between the fixing bar and the balance bar. The balance bar may include a hole overlapping the balance post.

According to an embodiment, the display device may include torsion springs disposed in the first joint units and the second joint units. The torsion spring may apply forces to the first joint units and the second joint units such that the first joint units and the second joint units are unfolded.

BRIEF DESCRIPTION OF THE DRAWINGS

The above and other objects and features of the disclosure will become apparent by describing in detail embodiments thereof with reference to the accompanying drawings.

DETAILED DESCRIPTION OF THE EMBODIMENTS

Figure 1:
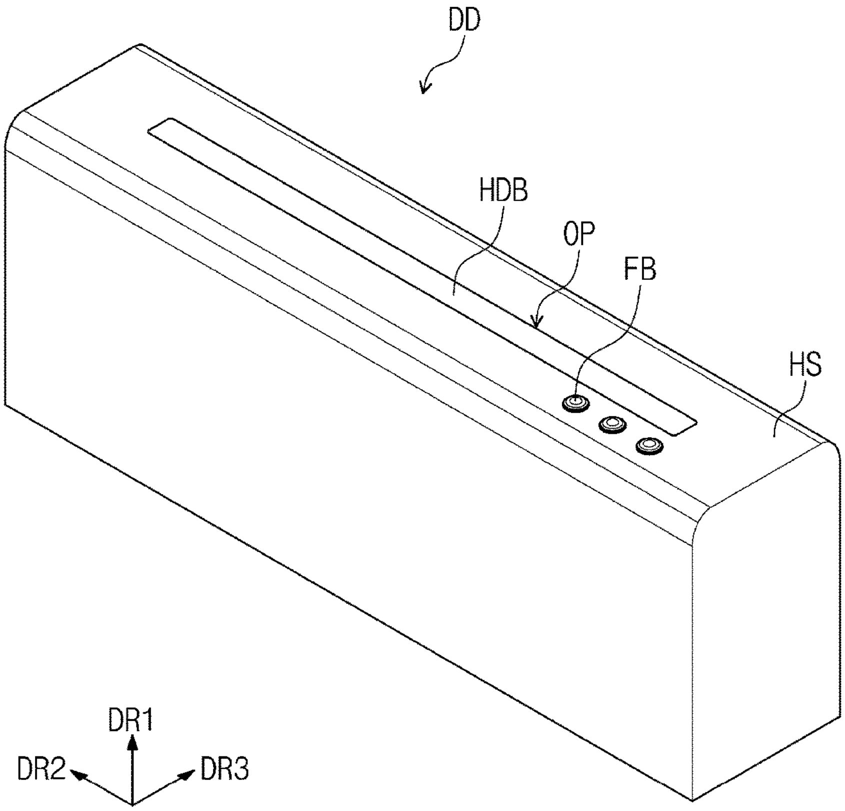
FIG. 1 is a schematic perspective view of a display device according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In this specification, when it is mentioned that a component (or, an area, a layer, a part, etc.) is referred to as being "on," "connected to" or "coupled to" another component, this means that the component may be directly on, connected to, or coupled to the other component or a third component may be present therebetween.

It will be understood that the terms "connected to" or "coupled to" may include a physical or electrical connection or coupling.

In the drawings, sizes, thicknesses, ratios, and dimensions of the elements may be exaggerated for ease of description and for clarity. Like numbers refer to like elements throughout.

Terms such as first, second, and the like may be used to describe various components, but the components should not be limited by the terms. The terms may be used only for distinguishing one component from other components. For example, without departing the scope of the disclosure, a first component may be referred to as a second component, and similarly, the second component may also be referred to as the first component. The terms of a singular form may include plural forms unless otherwise specified.

In addition, terms such as "below," "under," "above," and "over" are used to describe a relationship of components illustrated in the drawings. The terms are relative concepts and are described based on directions illustrated in the drawing.

It should be understood that terms such as "comprise," "include," and "have," when used herein, specify the presence of stated features, numbers, steps, operations, components, parts, or combinations thereof, but do not preclude the presence or addition of one or more other features, numbers, steps, operations, components, parts, or combinations thereof.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

The terms "face" and "facing" mean that a first element may directly or indirectly oppose a second element. In a case in which a third element intervenes between the first and second element, the first and second element may be understood as being indirectly opposed to one another, although still facing each other.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted in an idealized or overly formal sense unless expressly so defined herein.

Hereinafter, embodiments of the disclosure will be described with reference to the accompanying drawings.

Figure 2:
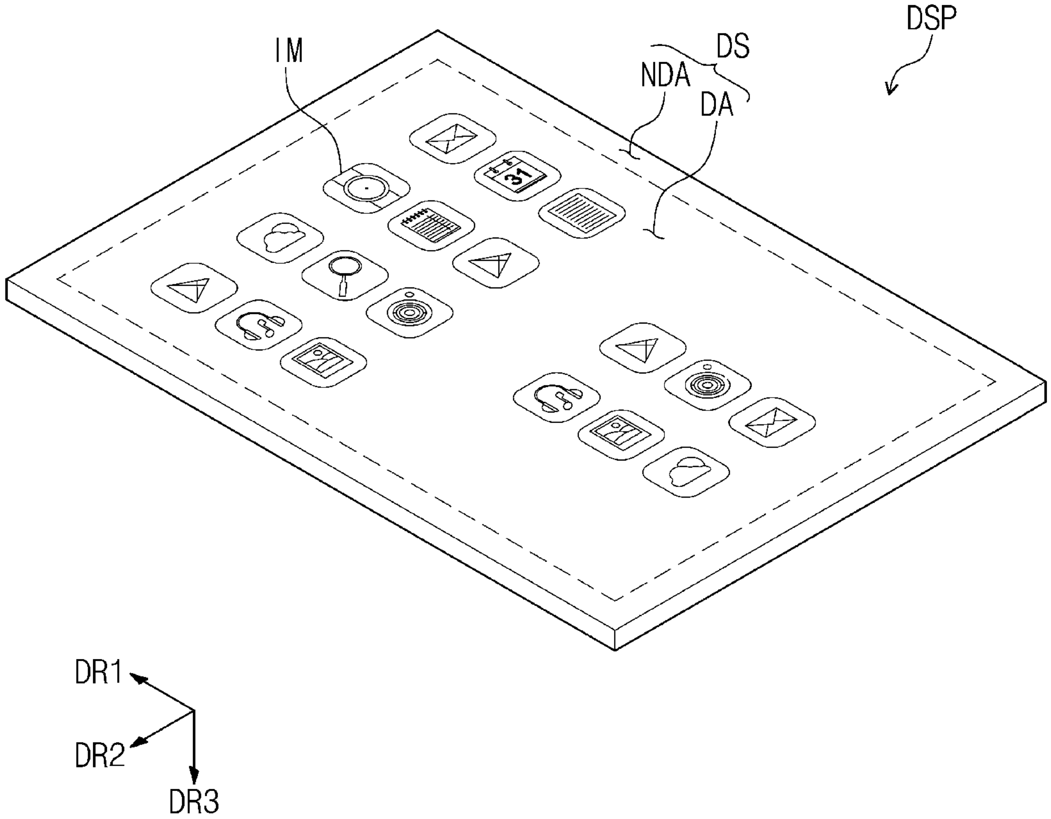
FIG. 2 is a schematic illustration of a display disposed inside a housing illustrated in FIG. 1.
Figure 3:
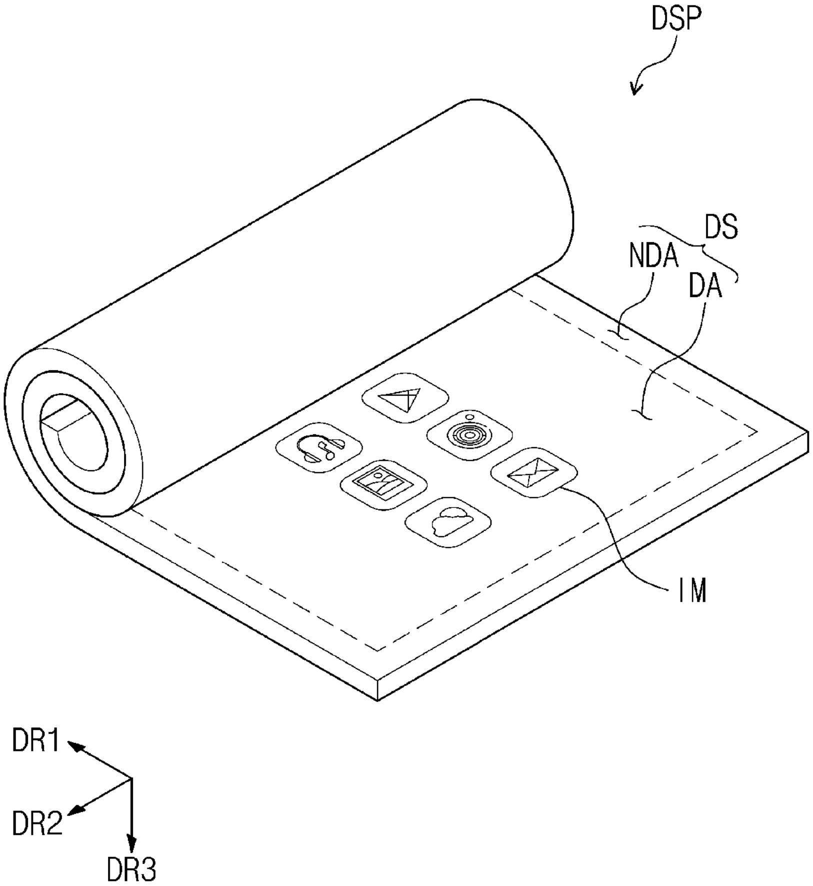
FIG. 3 is a schematic illustration of a rolled state of the display illustrated in FIG. 2.

FIG. 1 is a schematic perspective view of a display device according to an embodiment of the disclosure. FIG. 2 is a schematic illustration of a display disposed inside a housing illustrated in FIG. 1. FIG. 3 is a schematic illustration of a rolled state of the display illustrated in FIG. 2.

Referring to FIGS. 1 and 2, the display device DD may include the housing HS, a head bar HDB, the display DSP, and a function buttons FB.

An opening OP that is open toward a first direction DR1 may be defined in the housing HS. The housing HS may extend further in a second direction DR2 intersecting the first direction DR1 than the housing HS extends in the first direction DR1.

Hereinafter, a direction intersecting a plane defined by the first direction DR1 and the second direction DR2 is defined as a third direction DR3. The housing HS may extend further in the second direction DR2 than the housing HS extends in the third direction DR3.

The head bar HDB may be disposed in the opening OP. The head bar HDB may move toward or away from the housing HS in the first direction DR1.

The display DSP may be disposed inside the housing HS. The display DSP may have a plane defined by the first direction DR1 and the second direction DR2. The display DSP may have a rectangular shape with long sides extending in the first direction DR1 and short sides extending in the second direction DR2. However, without being limited thereto, the display DSP may have various other shapes such as a circular shape, a polygonal shape, or the like.

An upper surface of the display DSP may be defined as a display surface DS and may have a plane defined by the first direction DR1 and the second direction DR2. Images IM generated by the display DSP may be provided to a user through the display surface DS.

The display surface DS may include a display area DA and a non-display area NDA around the display area DA. The display area DA may display an image, and the non-display area NDA may not display an image. The non-display area NDA may surround the display area DA and may define a border of the display DSP that is printed in a color.

The function buttons FB may be disposed on an upper surface of the housing HS. The function buttons FB may provide various functions to the display device DD. For example, the display DSP disposed inside the housing HS may be moved outside the housing HS by the function buttons FB, or the display DSP outside the housing HS may be moved into the housing HS by the function buttons FB. The luminance and definition of an image displayed on the display DSP may be controlled by the function buttons FB.

Referring to FIG. 3, the display DSP may be a flexible display module that may be rolled. The display DSP may be rolled in the first direction DR1. The display DSP may be rolled from one side of the display DSP. The display surface DS may face toward the inside when display DSP is rolled.

Figure 4:
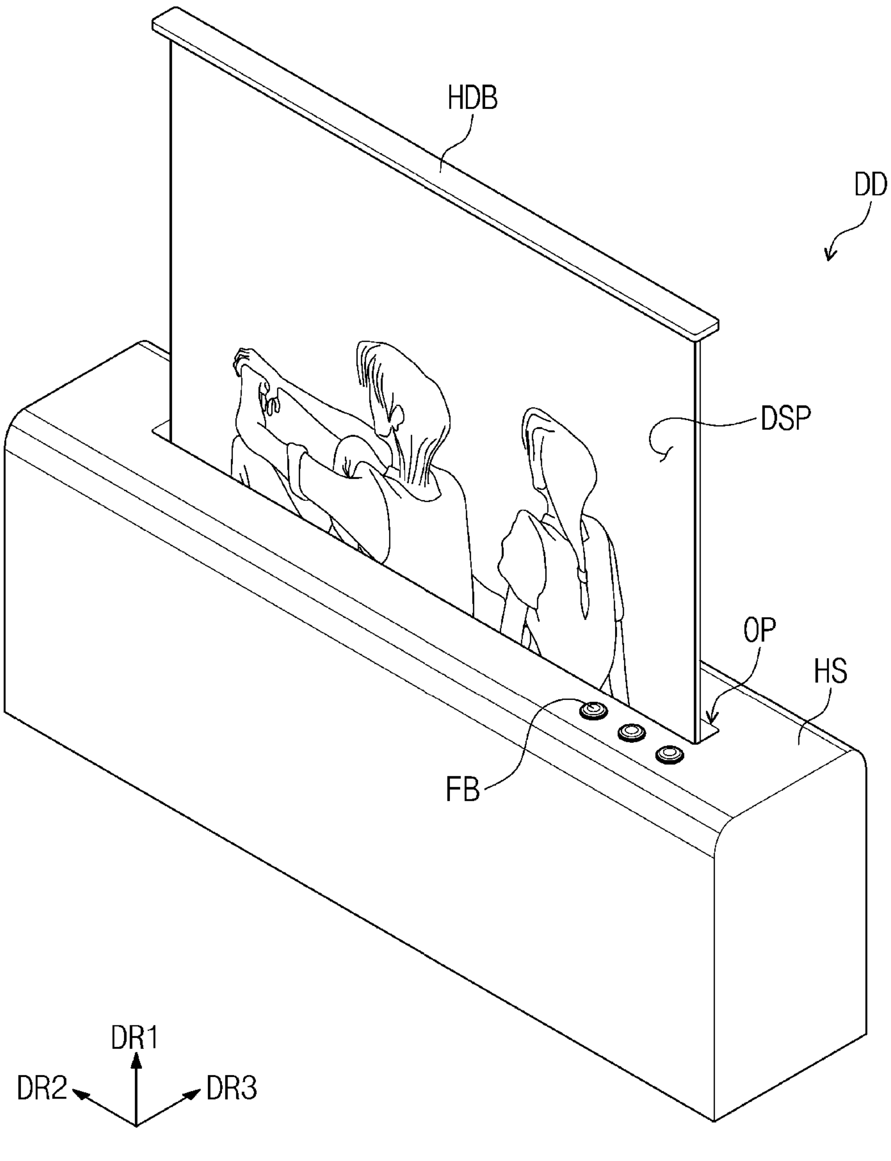
FIGS. 4 and 5 are schematic illustrations of the display extended and exposed outside the housing illustrated in FIG. 1.
Figure 5:
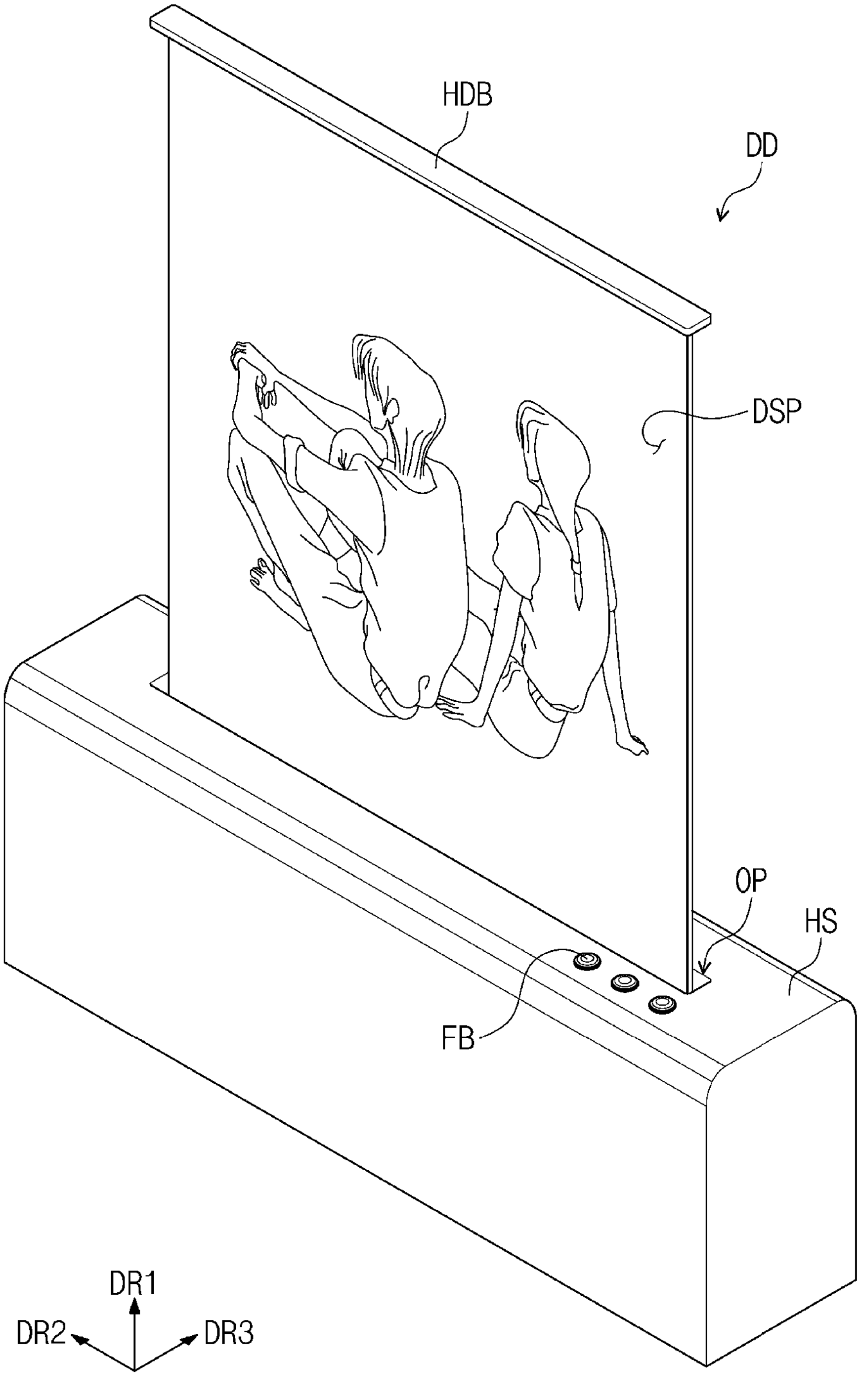

FIGS. 4 and 5 are schematic illustrations of the display extended and exposed outside the housing illustrated in FIG. 1.

Referring to FIGS. 4 and 5, the top of the display DSP in the first direction DR1 may be connected to the head bar HDB. As the head bar HDB moves away from the housing HS in the first direction DR1, the display DSP may be withdrawn from the housing HS to the outside through the opening OP. Accordingly, the display DSP may be extended outside the housing HS and may be exposed outside the housing HS.

In contrast, when the head bar HDB moves toward the housing HS in the first direction DR1, the display DSP may be inserted into the housing HS through the opening OP as illustrated in FIG. 1. Accordingly, the display DSP may be disposed inside the housing HS and may not be exposed to the outside.

An operation of extending the display DSP outside the housing HS may be controlled by an up button (reference numeral not illustrated) among the function buttons FB. An operation of retracting the display DSP into the housing HS may be performed by a down button (reference numeral not illustrated) among the function buttons FB. The area of an exposed surface of the display DSP may be adjusted by the up button and the down button.

An elevator may be used for extension of the display DSP. A configuration of the elevator will be described below in detail.

Figure 6:
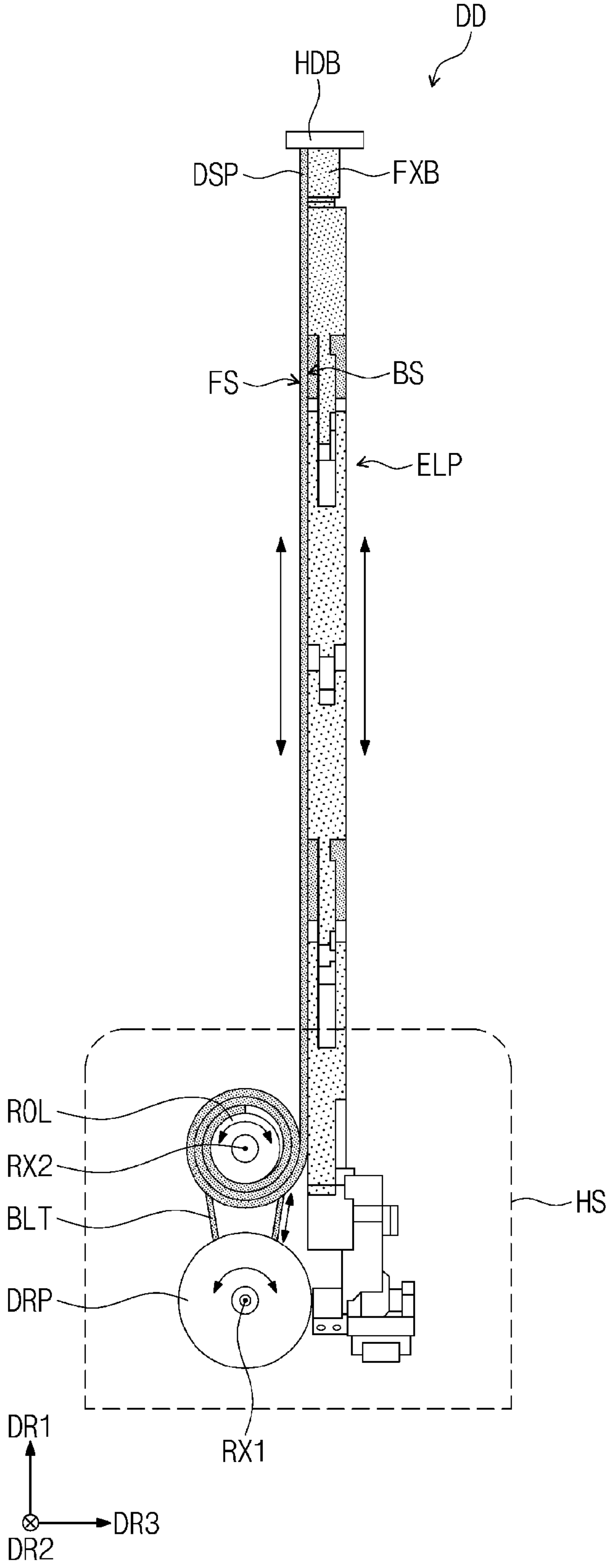
FIG. 6 is a schematic side view illustrating the display device equipped with an elevator used for extending the display illustrated In FIG. 5.

FIG. 6 is a schematic side view illustrating the display device equipped with the elevator used to extend the display illustrated In FIG. 5.

In FIG. 6, a side of the display device DD viewed in the second direction DR2 is illustrated, and the housing HS is illustrated by a dotted line.

Referring to FIG. 6, the display device DD may include a roller ROL, a driving part DRP, a belt BLT, a fixing bar FXB, and the elevator ELP. Hereinafter, surfaces of the display DSP that are opposite to each other in the third direction DR3 are defined as a front surface FS and a rear surface BS. The front surface FS may be defined as the display surface DS of the display DSP described above.

The roller ROL, the driving part DRP, and the belt BLT may be disposed inside the housing HS. The driving part DRP may be disposed under the roller ROL. The driving part DRP may be defined as a motor. The driving part DRP may rotate with respect to an axis of rotation RX1 parallel to the second direction DR2. The driving part DRP may rotate in the clockwise direction or the counterclockwise direction.

The roller ROL may be disposed over the driving part DRP. The roller ROL may rotate with respect to an axis of rotation RX2 parallel to the second direction DR2. The roller ROL may rotate in the clockwise direction or the counter-clockwise direction.

The terms "over" and "under" may be used to define relative positions of components with respect to the first direction DR1.

The belt BLT may connect the driving part DRP and the roller ROL. The belt BLT may be a timing belt that transmits power. A rotational force of the driving part DRP may be transmitted to the roller ROL through the belt BLT.

When the driving part DRP rotates in the clockwise direction, the rotational force of the driving part DRP may be transmitted to the roller ROL through the belt BLT, and the roller ROL may rotate in the clockwise direction. When the driving part DRP rotates in the counterclockwise direction, the rotational force of the driving part DRP may be transmitted to the roller ROL through the belt BLT, and the roller ROL may rotate in the counterclockwise direction.

The display DSP may have a first end and a second end that are opposite to each other in the first direction DR1, and the first end of the display DSP may be connected to the roller ROL. The display DSP may be wound around the roller ROL in the first direction DR1. The display DSP may be wound around or unwound from the roller ROL depending on a rotational direction of the roller ROL.

When the roller ROL is rotated in the clockwise direction by the driving part DRP, the display DSP may be wound around the roller ROL. As the display DSP is wound around the roller ROL, the area of the display DSP exposed outside the housing HS may be decreased. The display DSP may be consistently wound around the roller ROL and may be disposed inside the housing HS.

When the roller ROL is rotated in the counterclockwise direction by the driving part DRP, the display DSP may be unwound from the roller ROL. The display DSP may be unwound from the roller ROL and may be exposed outside the housing HS. As the display DSP is unwound from the roller ROL, the area of the display DSP exposed to the outside may be increased. When the display DSP is consistently unwound from the roller ROL, the display DSP may be extended outside the housing HS to the maximum.

The number of revolutions of the driving part DRP may be controlled by a controller (not illustrated) of the display device DD. When the driving part DRP rotates in the clockwise direction and the number of revolutions of the driving part DRP reaches a maximum value, all the display DSP may be entirely disposed inside the housing HS as illustrated in FIG. 1. When the driving part DRP rotates in the counterclockwise direction and the number of revolutions of the driving part DRP reaches a maximum value, the display DSP may be extended outside the housing HS to the maximum as illustrated in FIG. 5.

The fixing bar FXB may be disposed under the head bar HDB. The fixing bar FXB may be connected to the head bar HDB. The fixing bar FXB may be connected to the head bar HDB by various fastening methods such as screws or an adhesive means such as adhesives.

The second end of the display DSP in the first direction DR1, opposite to the first end of the display DSP, may be connected to the fixing bar FXB. The opposite end of the display DSP may be connected to the fixing bar FXB by various methods such as screws or an adhesive means such as adhesives. Furthermore, the second end of the display DSP may be connected to the head bar HDB.

The head bar HDB, the second end of the display DSP, and the fixing bar FXB may be moved together in the first direction DR1. The head bar HDB, the second end of the display DSP, and the fixing bar FXB may be moved toward or away from the housing HS in the first direction DR1.

The elevator ELP may be disposed on the rear surface BS of the display DSP. The elevator ELP may extend in the first direction DR1 on the rear surface BS of the display DSP and may be disposed adjacent to the roller ROL and the driving part DRP. The elevator ELP may be extended and retracted in the first direction DR1.

When the roller ROL is rotated in the clockwise direction by the driving part DRP and the display DSP is wound around the roller ROL, the elevator ELP may be retracted in the first direction DR1. As the elevator ELP is retracted in the first direction DR1, the head bar HDB, the opposite end of the display DSP, and the fixing bar FXB may be moved toward the housing HS in the first direction DR1.

When the roller ROL is rotated in the counterclockwise direction by the driving part DRP and the display DSP is unwound from the roller ROL, the elevator ELP may be extended in the first direction DR1. As the elevator ELP is extended in the first direction DR1, the head bar HDB, the opposite end of the display DSP, and the fixing bar FXB may be moved away from the housing HS in the first direction DR1.

Outside the housing HS, the display DSP may contact the elevator ELP. The elevator ELP may support the display DSP, and the display DSP may be extended to be flat by the elevator ELP outside the housing HS. Furthermore, the display DSP may be balanced by the elevator ELP outside the housing HS. A configuration of the display DSP will be described below in detail.

Figure 7:
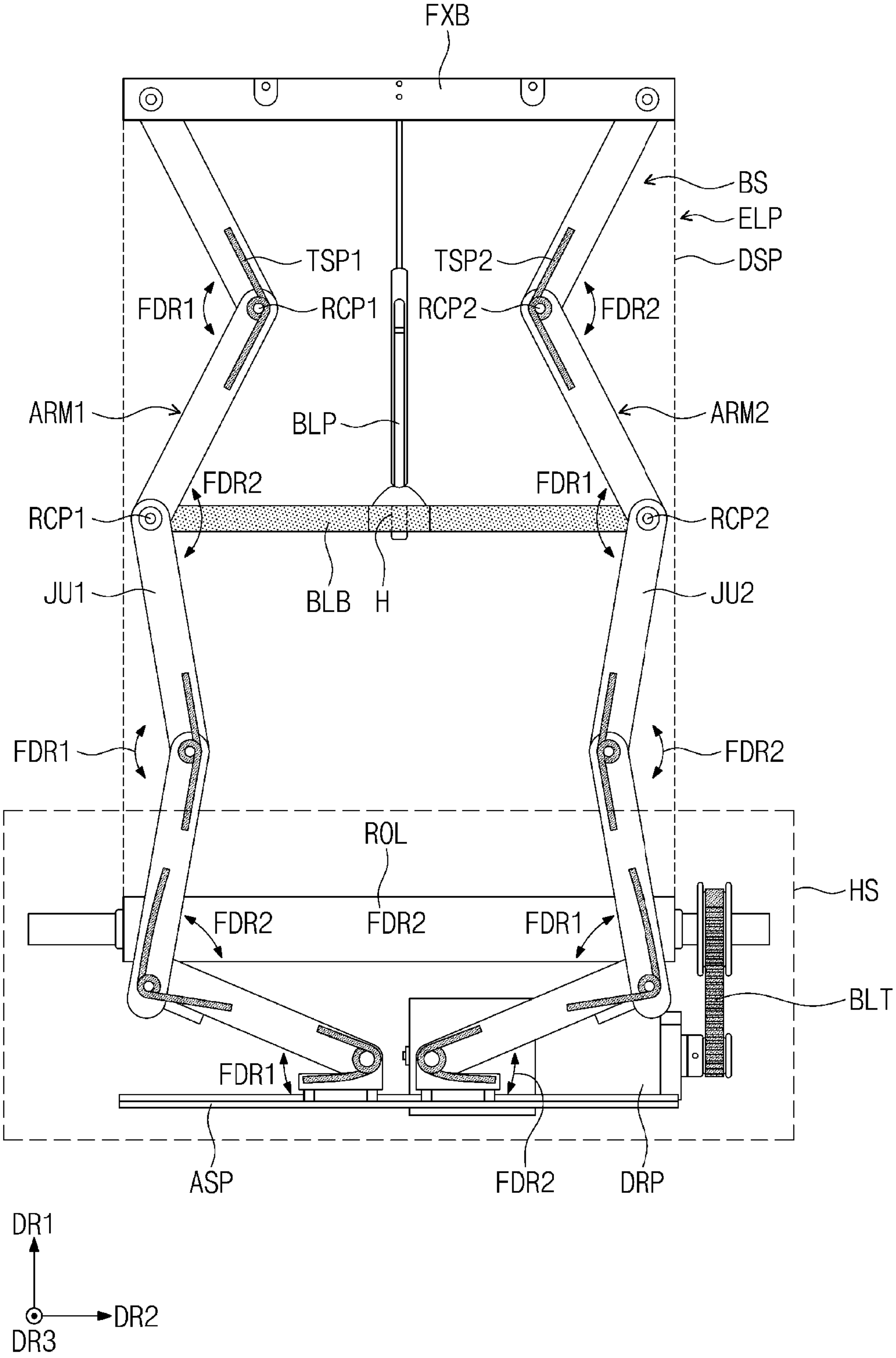
FIG. 7 is a schematic rear view of the elevator illustrated in FIG. 6.
Figure 8:
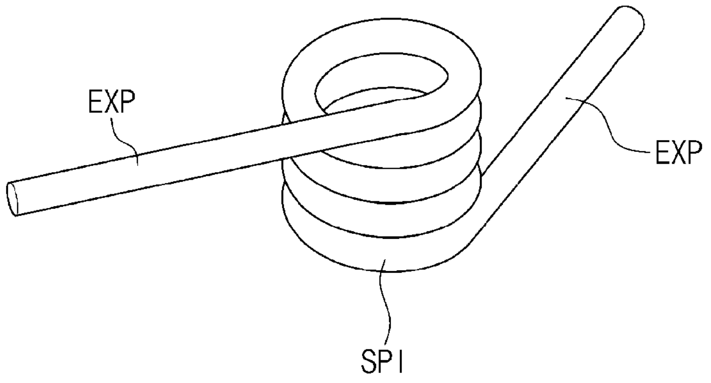
FIG. 8 is an enlarged schematic perspective view of one of first torsion springs illustrated in FIG. 7.

FIG. 7 is a schematic rear view of the elevator illustrated in FIG. 6. FIG. 8 is an enlarged schematic perspective view of one of first torsion springs illustrated in FIG. 7.

Elements of FIG. 6 will be described below together with FIG. 7 as needed. In FIG. 7, the display DSP and the housing HS are illustrated by dotted lines to emphasize the details of the elevator ELP.

Referring to FIGS. 6 and 7, the fixing bar FXB may extend in the second direction DR2. The fixing bar FXB may be spaced apart from the roller ROL and the driving part DRP in the first direction DR1. The driving part DRP may have a cylindrical shape extending in the second direction DR2. The roller ROL may have a cylindrical shape extending in the second direction DR2.

The elevator ELP may include a first arm ARM1, a second ARM2, an arm support ASP, a balance bar BLB, and a balance post BLP.

The first arm ARM1 and the second arm ARM2 may be disposed on the rear surface BS of the display DSP. The first arm ARM1 and the second arm ARM2 may extend in the first direction DR1 and may be spaced apart from each other in the second direction DR2. The first arm ARM1 and the second arm ARM2 may have symmetric shapes to each other in the second direction DR2.

The first arm ARM1 and the second arm ARM2 may be disposed adjacent to the roller ROL and the driving part DRP. The first arm ARM1 and the second arm ARM2 may have a foldable bellows style structure and may be extended or retracted in the first direction DR1.

The arm support ASP may extend in the second direction DR2 and may face the fixing bar FXB in the first direction DR1. The driving part DRP, the first arm ARM1, and the second arm ARM2 may be disposed on the arm support ASP.

The first arm ARM1 and the second arm ARM2 may be disposed between the arm support ASP and the fixing bar FXB. One end of the first arm ARM1 and one end of the second arm ARM2 may be connected to the arm support ASP. The opposite end of the first arm ARM1 and the opposite end of the second arm ARM2 may be connected to the fixing bar FXB. The opposite end of the first arm ARM1 and the opposite end of the second arm ARM2 that are coupled the fixing bar FXB maybe rotatable. The first arm ARM1 and the second arm ARM2 may be connected to the second end of the display DSP through the fixing bar FXB.

In case that the display DSP is wound around the roller ROL, the first arm ARM1 and the second arm ARM2 may be retracted in the first direction DR1. As the first arm ARM1 and the second arm ARM2 are retracted in the first direction DR1, the head bar HDB and the fixing bar FXB may be moved toward the housing HS in the first direction DR1.

In case that the display DSP is unwound from the roller ROL, the first arm ARM1 and the second arm ARM2 may be extended in the first direction DR1. As the first arm ARM1 and the second arm ARM2 are extended in the first direction DR1, the head bar HDB and the fixing bar FXB may be moved away from the housing HS in the first direction DR1.

The first arm ARM1 and the second arm ARM2 may include joint units JU1 and JU2, rotational coupling portions RCP1 and RCP2, and torsion springs TSP1 and TSP2.

The first arm ARM1 may include the first joint units JU1 coupled to be rotatable relative to each other. The second arm ARM2 may include second joint units JU2 coupled to be rotatable relative to each other. Hereinafter, in this specification, the order of the first joint units JU1 and the second joint units JU2 will be described as increasing from the fixing bar FXB.

The first joint units JU1 may be coupled in a bellows style and may be unfolded or folded in the first direction DR1. The first joint units JU1 may be extended or retracted in the first direction DR1 by being unfolded or folded in the first direction DR1.

A first folding direction FDR1 in which a $k^{th}$ first joint unit JU1 and a $(k+1)^{th}$ first joint unit JU1 are folded may be opposite to a second folding direction FDR2 in which the $(k+1)^{th}$ first joint unit JU1 and a $(k+2)^{th}$ first joint unit JU1 are folded. "k" is a natural number.

In FIG. 7, the first folding direction FDR1 may be defined as the direction in which the first joint unit JU1 is folded leftward. In FIG. 7, the second folding direction FDR2 may be defined as the direction in which the first joint unit JU1 is folded rightward.

The second joint units JU2 may be coupled in a bellows style and may be unfolded or folded in the first direction DR1. The second joint units JU2 may be extended or retracted in the first direction DR1 by being unfolded or folded in the first direction DR1.

The folding directions of the second joint units JU2 may be symmetric to the folding directions of the first joint units JU1. For example, a $k^{th}$ second joint unit JU2 and a $(k+1)^{th}$ second joint unit JU2 may be folded in the second folding direction FDR2, and the $(k+1)^{th}$ second joint unit JU2 and a $(k+2)^{th}$ second joint unit JU2 may be folded in the first folding direction FDR1.

The uppermost first joint unit JU1 and the uppermost second joint JU2 may be connected to the fixing bar FXB. The first joint JU1 connected to the fixing bar FXB and the second joint JU2 connected to the fixing bar FXB may be coupled to the fixing bar FXB in a rotatable connection.

The first arm ARM1 may include the first rotational coupling portions RCP1 that rotatably couple the first joint units JU1. When viewed in the third direction DR3, the first rotational coupling portions RCP1 may have a circular shape.

Each of the first rotational coupling portions RCP1 may rotatably couple two adjacent first joint units JU1 to each other. A first rotational coupling portion RCP1 may rotatably couple a side of the $k^{th}$ first joint unit JU1 and a side of the $(k+1)^{th}$ first joint unit JU1 that are adjacent to each other. However, without being limited thereto, the first rotational coupling portion RCP1 may couple the $k_{th}$ first joint unit JU1 and the $(k+1)^{th}$ first joint unit JU1 at a variety of possible locations.

The second arm ARM2 may include the second rotational coupling portions RCP2 that rotatably couple the second joint units JU2. When viewed in the third direction DR3, the second rotational coupling portions RCP2 may have a circular shape.

Each of the second rotational coupling portions RCP2 may rotatably couple two adjacent second joint units JU2 to each other. A second rotational coupling portion RCP2 may rotatably couple a side of the $k^{th}$ second joint unit JU2 and a side of the $(k+1)^{th}$ second joint unit JU2 that are adjacent to each other. However, without being limited thereto, the second rotational coupling portion RCP2 may couple the $k^{th}$ second-joint unit JU2 and the $(k+1)^{th}$ second joint unit JU2 at a variety of locations.

Referring to FIGS. 7 and 8, the first arm ARM1 may include first torsion springs TSP1 disposed in the first joint units JU1. The second arm ARM2 may include second torsion springs TSP2 disposed in the second joint units JU2.

To clearly illustrate the first torsion springs TSP1 and the second torsion springs TSP2, the first torsion springs TSP1 and the second torsion springs TSP2 are illustrated in FIG. 7 to be visible together with the first joint units JU1 and the second joint units JU2. However, substantially, the first torsion springs TSP1 and the second torsion springs TSP2 may be disposed inside the first joint units JU1 and the second joint units JU2 and therefore may not be visible from the outside.

The first torsion springs TSP1 may each be disposed in a portion where the first joint units JU1 are coupled with each other. At least one of the first torsion springs TSP1 may be mounted on one of the first rotational coupling portions RCP1.

The first torsion springs TSP1 may not be mounted on some of the first rotational coupling portions RCP1 (for example, the second of the first rotational coupling portions RCP1 from the fixing bar FXB), and the first torsion springs TSP1 may be mounted on the remaining first rotational coupling portions RCP1. However, embodiments of the disclosure are not limited thereto. For example, the first torsion springs TSP1 may be mounted on all the first rotational coupling portions RCP1. In other embodiments, only one first torsion spring TSP1 which may be mounted on one of the first rotational coupling portion RCP1 may be used.

The first torsion springs TSP1 may be coupled to the first rotational coupling portions RCP1 by surrounding the first rotational coupling portions RCP1. Each of the first torsion springs TSP1 may include a spring part SPI and extension portions EXP.

The spring part SPI may surround a corresponding one of the first rotational coupling portions RCP1 and may be coupled to the corresponding first rotational coupling portion RCP1. The extension portions EXP may extend from the spring part SPI. The extension portions EXP may extend toward the first joint units JU1 coupled to the corresponding first rotational coupling portion RCP1.

The first torsion springs TSP1 may apply forces (e.g., elastic forces acting in the first direction DR1) to the first joint units JU1 such that the first joint units JU1 with the first torsion springs TSP1 are extended in the first direction DR1.

The second torsion springs TSP2 may each be disposed in a portion where the second joint units JU2 are coupled to each other. At least one of the second torsion spring TSP2 may be mounted on one of the second rotational coupling portion RCP2.

The second torsion springs TSP2 may not be mounted on some of the second rotational coupling portions RCP2 (for example, the second of the second rotational coupling portions RCP2 from the fixing bar FXB), and the second torsion springs TSP2 may be mounted on the remaining second rotational coupling portions RCP2. However, embodiments of the disclosure are not limited thereto. For example, the second torsion springs TSP2 may be mounted on all the second rotational coupling portions RCP2. In other embodiments, only one second torsion spring TSP2 may be mounted on one of the second rotational coupling portion RCP2.

The second torsion springs TSP2 may be coupled to the second rotational coupling portions RCP2 by surrounding the second rotational coupling portions RCP2. Like the first torsion springs TSP1, the second torsion springs TSP2 may each include a spring part SPI coupled to the corresponding second rotational coupling portion RCP2 and extension portions EXP extending from the spring part SPI toward the corresponding second joint units JU2.

The second torsion springs TSP2 may apply forces (e.g., elastic forces acting in the first direction DR1) to the second joint units JU2 such that the second joint units JU2 with the second torsion springs TSP2 are extended in the first direction DR1.

Referring to FIG. 7, the balance bar BLB may be disposed between the first arm ARM1 and the second arm ARM2 and may be connected to the first arm ARM1 and the second arm ARM2. The balance bar BLB may extend in the second direction DR2.

The balance bar BLB may be connected to a coupling portion of the first joint units JU1 and a coupling portion of the second joint units JU2. For example, an end of the balance bar BLB may be connected to a coupling portion of the $(k+1)^{th}$ first joint unit JU1 and the $(k+2)^{th}$ first joint unit JU1. An opposite end of the balance bar BLB may be connected to a coupling portion of the $(k+1)^{th}$ second joint unit JU2 and the $(k+2)^{th}$ second joint unit JU2.

Although the balance bar BLB in FIG. 7 is illustrated as connected to a coupling portion of the second and third of the first joint units JU1 and a coupling portion of the second and third of the second joint units JU2, the connection positions of the balance bar BLB are not limited thereto.

The first torsion springs TSP1 and the second torsion springs TSP2 may not be disposed in the portions to which the balance bar BLB is connected. For example, the first torsion springs TSP1 and the second torsion springs TSP2 may not be disposed in the coupling portion of the $(k+1)^{th}$ first joint unit JU1 and the $(k+2)^{th}$ first joint unit JU1 and the coupling portion of the $(k+1)^{th}$ second joint unit JU2 and the $(k+2)^{th}$ second joint unit JU2 where the balance bar BLB is connected. However, without being limited thereto, the first torsion springs TSP1 and the second torsion springs TSP2 may be disposed in the portions where the balance bar BLB is connected.

The balance post BLP may be disposed between the balance bar BLB and the fixing bar FXB and may extend in the first direction DR1. The balance post BLP may be connected to the balance bar BLB and the fixing bar FXB. The balance post BLP may be extended and retracted in the first direction DR1.

In case that the driving part DRP rotates, and the display DSP is unwound from the roller ROL, the first joint units JU1 and the second joint units JU2 may be unfolded and extended in the first direction DR1 by elastic forces of the first torsion springs TSP1 and the second torsion springs TSP2. Accordingly, a separate driving part for unfolding the first joint units JU1 and the second joint units JU2 in the first direction DR1 may not be required.

As the first joint units JU1 and the second joint units JU2 are unfolded in the first direction DR1, the first joint units JU1 and the second joint units JU2 may support the display DSP such that the display DSP is extended to be flat.

In case that the driving part DRP rotates, and the display DSP is wound around the roller ROL, the rotational force of the driving part DRP may be greater than the elastic forces of the first torsion springs TSP1 and the second torsion springs TSP2. The first joint units JU1 and the second joint units JU2 may be forcibly folded while the fixing bar FXB moves toward the housing HS. Accordingly, the first joint units JU1 and the second joint units JU2 may be folded and retracted toward the housing HS in the first direction DR1.

The first torsion springs TSP1 may also be forcibly folded together with the first joint units JU1, and the second torsion springs TSP2 may also be forcibly folded together with the second joint units JU2. Substantially, the extension portions EXP of the first torsion springs TSP1 and the second torsion springs TSP2 illustrated in FIG. 8 may move toward each other, and the first torsion springs TSP1 and the second torsion springs TSP2 may be folded.

The balance bar BLB may include a hole H overlapping the balance post BLP. When the display DSP is wound around the roller ROL, the balance post BLP may be retracted and moved in the first direction DR1 while the fixing bar FXB moves toward the housing HS. When the balance post BLP is retracted and moved in the first direction DR1, the balance post BLP may be moved through the hole H.

The folding of the first joint units JU1 and the second joint units JU2 and the corresponding movement of the balance bar BLB and the balance post BLP will be described below in detail in FIGS. 14 to 18.

Figure 9:
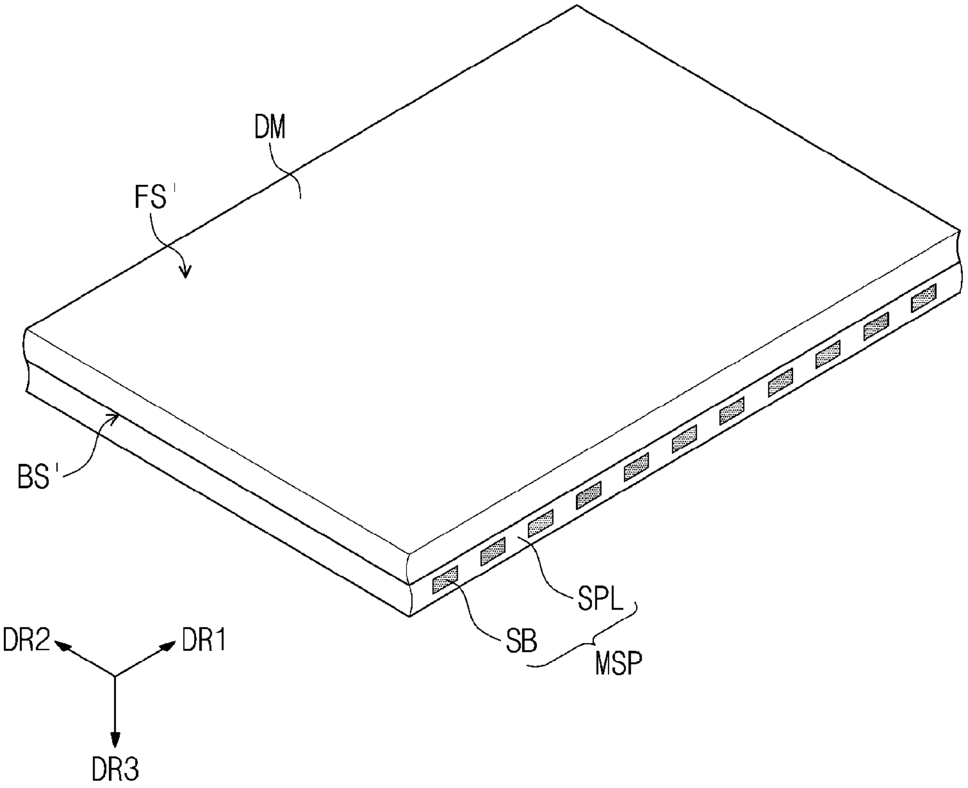
FIG. 9 is a schematic perspective view of part of the display illustrated in FIG. 6.
Figure 10:
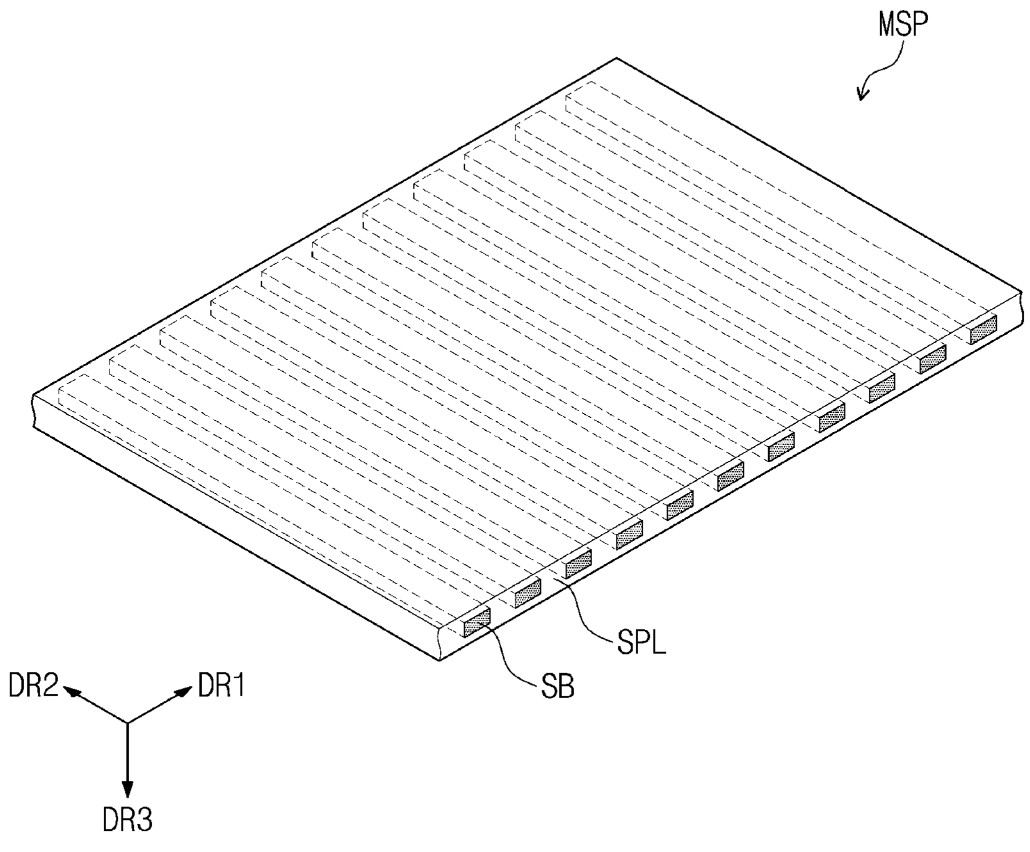
FIG. 10 is a schematic perspective view of a module support illustrated in FIG. 9.

FIG. 9 is a schematic perspective view of part of the display illustrated in FIG. 6. FIG. 10 is a schematic perspective view of a module support illustrated in FIG. 9.

Referring to FIGS. 9 and 10, the display DSP may include a display module DM and the module support MSP disposed on one surface of the display module DM. Opposite surfaces of the display module DM that are opposite to each other in the third direction DR3 may be defined as a front surface FS' and a rear surface BS'. The front surface FS' of the display module DM may define the front surface FS of the above-described display DSP. The module support MSP may be disposed on the rear surface BS' of the display module DM.

The module support MSP may be attached to the rear surface BS' of the display module DM. For example, the module support MSP may be attached to the rear surface BS' of the display module DM using a pressure sensitive adhesive.

The module support MSP may include a support layer SPL disposed on the rear surface BS' of the display module DM and support bars SB disposed in the support layer SPL. When viewed in the second direction DR2, the support bars SB may have a rectangular shape. However, the shape of the support bars SB is not limited thereto.

The support bars SB may extend in the second direction DR2 and may be arranged in the first direction DR1. In FIG. 10, the support bars SB disposed in the support layer SPL are illustrated by dotted lines. The support bars SB may be spaced apart from each other at equal intervals in the first direction DR1. However, the embodiments are not limited to specific intervals between the support bars SB.

The support bars SB may be of a rigid type. For example, the support bars SB may contain metal. The support bars SB may contain aluminum, stainless steel, or invar. Furthermore, the support bars SB may contain metal that is attracted to a magnet.

The support layer SPL may contain an elastomer having an elasticity. For example, the support layer SPL may contain at least one of thermoplastic polyurethane, silicone, thermoplastic rubbers, elastolefin, thermoplastic olefin, polyamide, polyether block amide, synthetic polyisoprene, polybutadiene, chloroprene rubber, butyl rubber, styrene-butadiene, epichlorohydrin rubber, polyacrylic rubber, silicone rubber, fluorosilicone rubber, fluoroelastomers, and ethylene-vinyl acetate.

The support bars SB may have a higher modulus than the support layer SPL. The support layer SPL may have a modulus of about 20 KPa to about 20 MPa. The support bars SB may have a modulus of about 1 GPa to about 200 GPa. The support layer SPL and the support bars SB may support the display module DM.

When the support layer SPL is not used and the support bars SB are attached to the lower surface of the display module DM to support the display module DM, the display module DM may be deformed in spaces between the support bars SB. For example, when the display module DM is repeatedly rolled and unrolled, portions of the display module DM that overlap the spaces between the support bars SB may sag downward. The deformation may show a corrugated shape that may be visible from the outside. The surface quality of the display module DM may be degraded.

The support bars SB having a higher stiffness may support the display module DM, and the elastic support layer SPL may provide a flat surface to the display module DM. Because the display module DM is attached to the support layer SPL having a flat surface, the portions of the display module DM that overlap the spaces between the support bars SB may remain flat without deformation. Thus, the surface quality of the display module DM may be improved.

Figure 11:
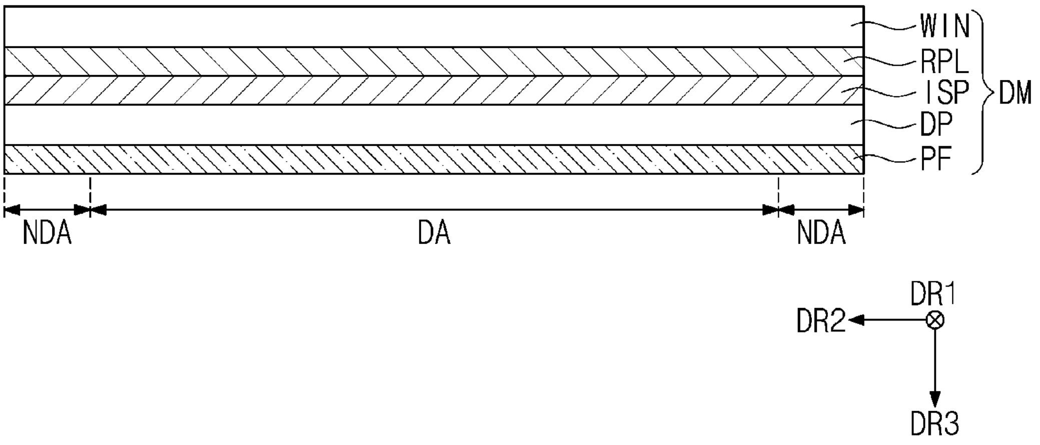
FIG. 11 is a schematic view illustrating a section of a display module illustrated in FIG. 10.

FIG. 11 is a schematic view illustrating a section of the display module illustrated in FIG. 10.

In FIG. 11, a section of the display module DM viewed in the first direction DR1 is schematically illustrated.

Referring to FIG. 11, the display module DM may include a display panel DP, an input sensing layer ISP, an anti-reflection layer RPL, a window WIN, and a panel protection film PF.

The display panel DP may be a flexible display panel. The display panel DP according to an embodiment of the disclosure may be an emissive display panel, but is not limited thereto. For example, the display panel DP may be an organic light emitting display panel or an inorganic light emitting display panel. An emissive layer of the organic light emitting display panel may contain an organic light emitting material. An emissive layer of the inorganic light emitting display panel may contain quantum dots, quantum rods, or the like. Hereinafter, the display panel DP will be described to be an organic light emitting display panel.

The input sensing layer ISP may be disposed on the display panel DP. The input sensing layer ISP may include a plurality of sensor parts (not illustrated) for sensing an external input using a capacitive sensing technique. The input sensing layer ISP may be directly manufactured on the display panel DP in the manufacture of the display module DM. However, without being limited thereto, the input sensing layer ISP may be manufactured as a separate panel and may be attached to the display panel DP by an adhesive layer.

The anti-reflection layer RPL may be directly formed on the input sensing layer ISP. However, without being limited thereto, in other embodiments, the anti-reflection layer RPL may be coupled to the input sensing layer ISP by an adhesive layer. The anti-reflection layer RPL may be defined as a film for preventing reflection of external light. The anti-reflection layer RPL may decrease the reflectivity of external light incident toward the display panel DP from above the display device DD.

When external light travelling toward the display panel DP is reflected from the display panel DP and provided back to an external user, the user may visually recognize the external light as in a mirror. To prevent such reflections, the anti-reflection layer RPL may include color filters that display the same colors as those of pixels of the display panel DP.

External light may be filtered in the same colors as those of the pixels by the color filters. Thus, the external light may not be visible to the user. In other embodiments, without being limited thereto, the anti-reflection layer RPL may include a polarizer film for decreasing the reflectivity of external light. The polarizer film may include a phase retarder and/or a polarizer. The color filters may be directly formed on the input sensing layer ISP. The polarizer film may be attached to the input sensing layer ISP by an adhesive layer.

The window WIN may be disposed on the anti-reflection layer RPL. The window WIN may be attached to the anti-reflection layer RPL by an adhesive layer. The window WIN may protect the display panel DP, the input sensing layer ISP, and the anti-reflection layer RPL from external scratches and shocks.

The panel protection film PF may be disposed under the display panel DP. The panel protection film PF may be attached to the display panel DP by an adhesive layer. The panel protection film PF may protect a lower portion of the display panel DP. The panel protection film PF may contain a flexible plastic material such as polyethyleneterephthalate (PET).

Figure 12:
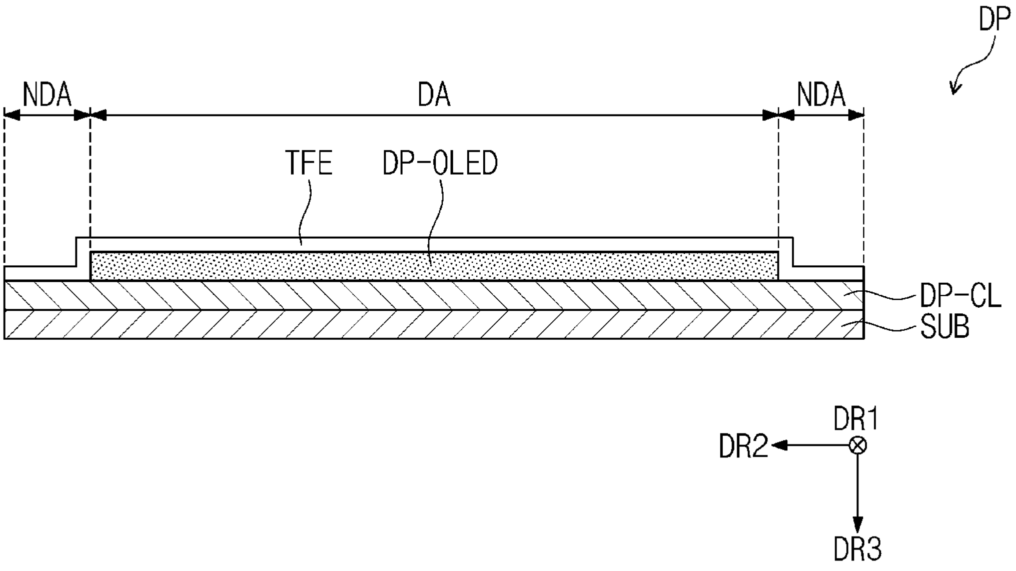
FIG. 12 is a schematic view illustrating a section of a display panel illustrated in FIG. 11.

FIG. 12 is a schematic view illustrating a section of the display panel illustrated in FIG. 11.

In FIG. 12, a section of the display panel DP viewed in the first direction DR1 is illustrated.

Referring to FIG. 12, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include a display area DA and a non-display area NDA around the display area DA. The substrate SUB may contain a flexible plastic material such as polyimide (PI). The display element layer DP-OLED may be disposed on the display area DA.

Multiple pixels may be disposed in the display area DA. Each of the pixels may include a light emitting element that is electrically connected to a transistor disposed in the circuit element layer DP-CL and is disposed in the display element layer DP-OLED.

The thin film encapsulation layer TFE may be disposed on the circuit element layer DP-CL to cover the display element layer DP-OLED. The thin film encapsulation layer TFE may include inorganic layers and an organic layer between the inorganic layers. The inorganic layers may protect the pixels from moisture or oxygen. The organic layer may protect the pixels from foreign matter such as dust particles.

Figure 13:
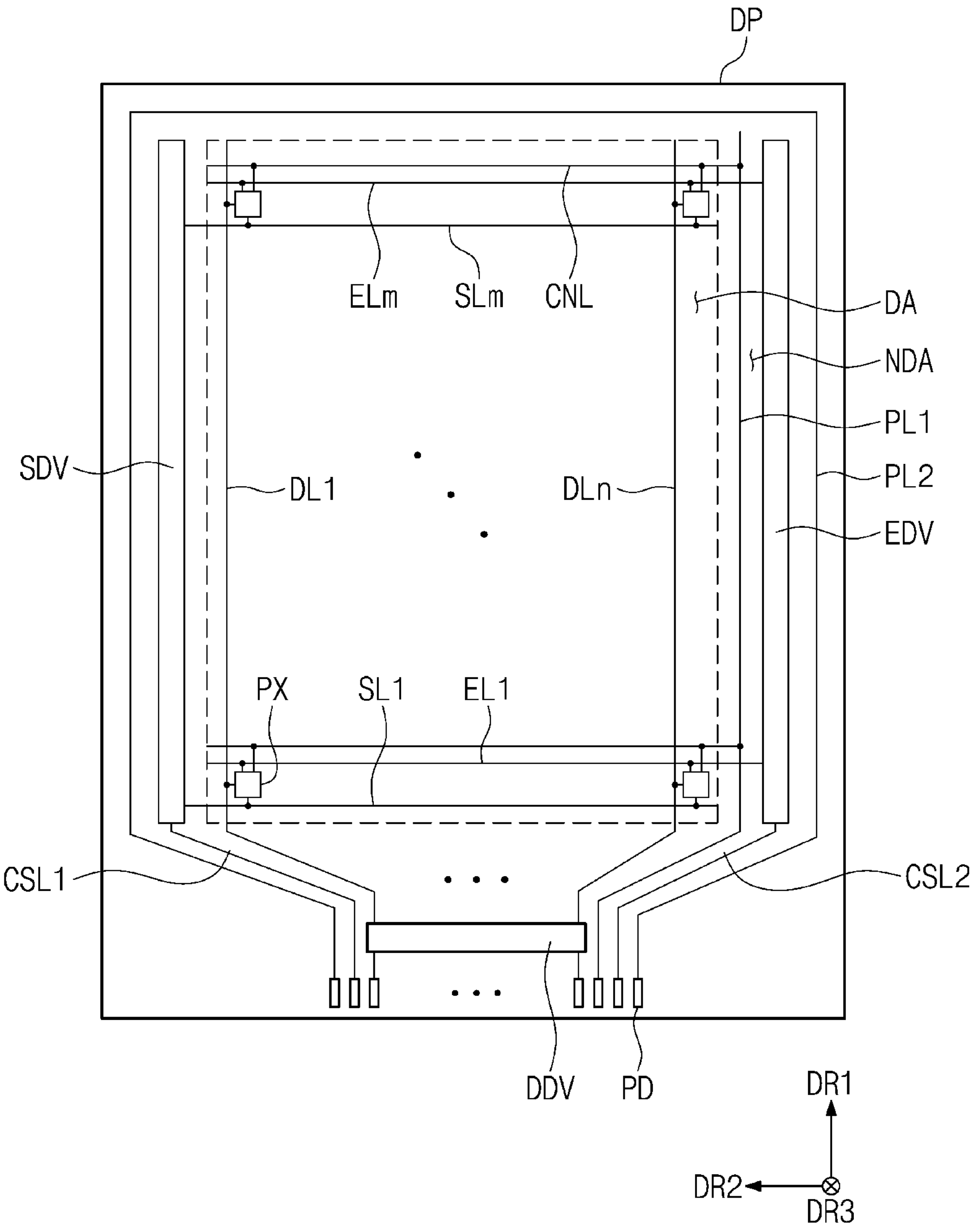
FIG. 13 is a schematic plan view of the display panel illustrated in FIG. 12.

FIG. 13 is a schematic plan view of the display panel illustrated in FIG. 12.

Referring to FIG. 13, the display device DD may include the display panel DP, a scan driver SDV, a data driver DDV, an emission driver EDV, and multiple pads PD. The display panel DP may include the display area DA and the non-display area NDA surrounding the display area DA.

The display panel DP may include multiple pixels PX, scan lines SL1 to SLm, data lines DL1 to DLn, emission lines EL1 to Elm, a first control line CSL1 and a second control line CSL2, a first power line PL1 and a second power line PL2, and connecting lines CNL. "m" and "n" are natural numbers.

The pixels PX may be disposed in the display area DA. The scan driver SDV and the emission driver EDV may be disposed in the non-display areas NDA adjacent to long sides of the display panel DP, respectively. The data driver DDV may be disposed in the non-display area NDA adjacent to one of the short sides of the display panel DP. In a plan view, the data driver DDV may be adjacent to a lower end of the display panel DP.

The scan lines SL1 to SLm may extend in the second direction DR2 and may be electrically connected to the pixels PX and the scan driver SDV. The data lines DL1 to DLn may extend in the first direction DR1 and may be electrically connected to the pixels PX and the data driver DDV. The emission lines EL1 to ELm may extend in the second direction DR2 and may be electrically connected to the pixels PX and the emission driver EDV.

The first power line PL1 may extend in the first direction DR1 and may be disposed in the non-display area NDA. The first power line PL1 may be disposed between the display area DA and the emission driver EDV. However, without being limited thereto, the first power line PL1 may be disposed between the display area DA and the scan driver SDV.

The connecting lines CNL may extend in the second direction DR2 and may be arranged in the first direction DR1. The connecting lines CNL may be electrically connected to the first power line PL1 and the pixels PX. A first voltage may be applied to the pixels PX through the first power line PL1 and the connecting lines CNL electrically connected with each other.

The second power line PL2 may be disposed in the non-display area NDA. The second power line PL2 may extend along long sides of the display panel DP and the other short side of the display panel DP where the data driver DDV is not disposed. The second power line PL2 may be disposed outward of the scan driver SDV and the emission driver EDV.

Although not illustrated, the second power line PL2 may extend toward the display area DA and may be electrically connected to the pixels PX. A second voltage having a lower level than the first voltage may be applied to the pixels PX through the second power line PL2.

The first control line CSL1 may be electrically connected to the scan driver SDV and may extend toward the lower end of the display panel DP in a plan view. The second control line CSL2 may be electrically connected to the emission driver EDV and may extend toward the lower end of the display panel DP in a plan view. The data driver DDV may be disposed between the first control line CSL1 and the second control line CSL2.

The pads PD may be disposed on the display panel DP. The pads PD may be closer to the lower end of the display panel DP than the data driver DDV. The data driver DDV, the first power line PL1, the second power line PL2, the first control line CSL1, and the second control line CSL2 may be electrically connected to the pads PD. The data lines DL1 to DLn may be electrically connected to the data driver DDV, and the data driver DDV may be electrically connected to the pads PD corresponding to the data lines DL1 to DLn.

Although not illustrated, the display device DD may further include a timing controller for controlling operations of the scan driver SDV, the data driver DDV, and the emission driver EDV and a voltage generator for generating the first voltage and the second voltage. The timing controller and the voltage generator may be electrically connected to corresponding pads PD through a printed circuit board.

The scan driver SDV may generate scan signals, and the scan signals may be applied to the pixels PX through the scan lines SL1 to SLm. The data driver DDV may generate data voltages, and the data voltages may be applied to the pixels PX through the data lines DL1 to DLn. The emission driver EDV may generate emission signals, and the emission signals may be applied to the pixels PX through the emission lines EL1 to ELm.

The pixels PX may receive the data voltages in response to the scan signals. The pixels PX may display an image by emitting light having luminance corresponding to the data voltages in response to the emission signals. Emission time of the pixels PX may be controlled by the emission signals.

Figure 14:
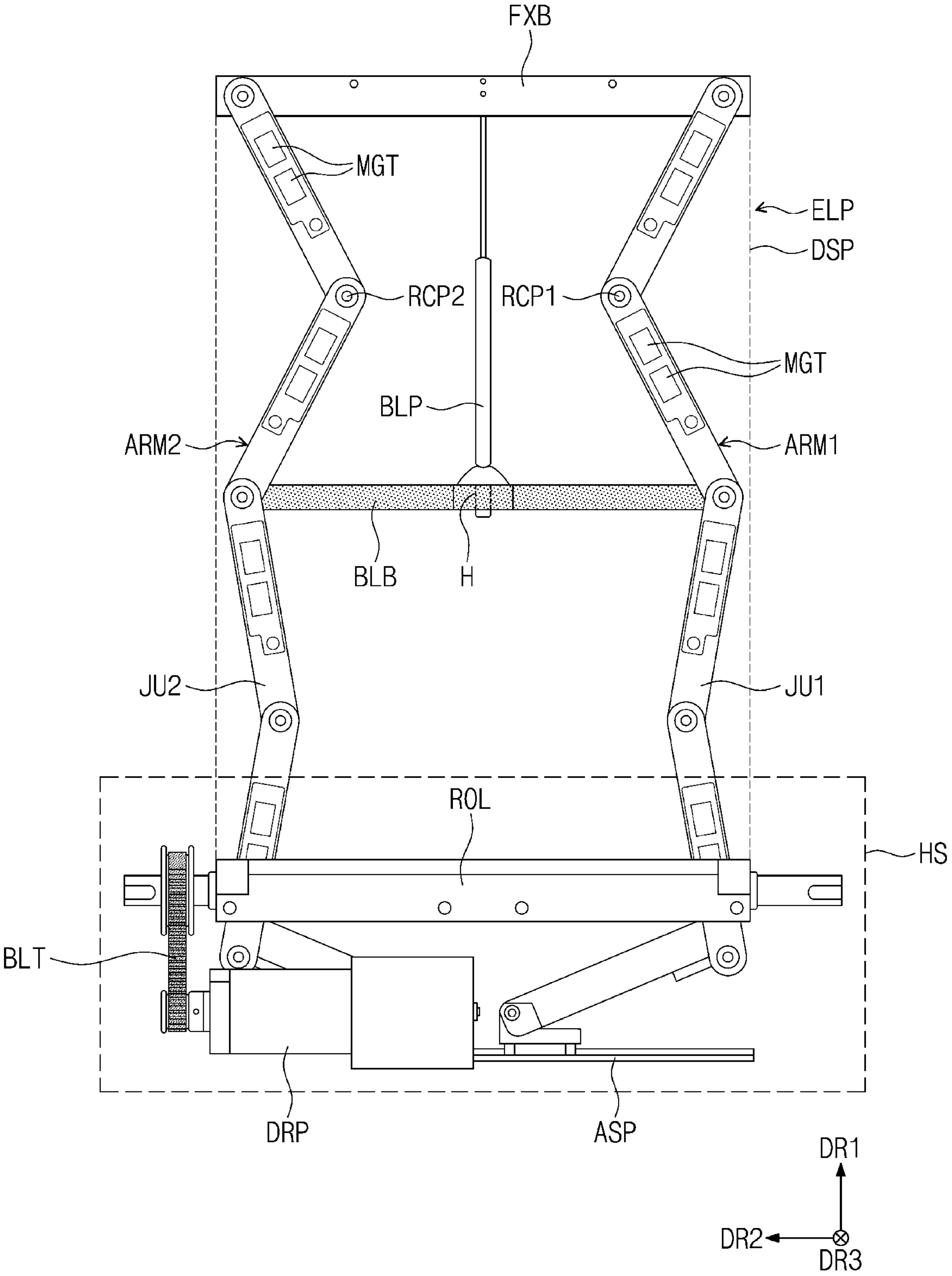
FIG. 14 is a schematic illustration of a front side of the elevator illustrated in FIG. 6.
Figure 15:
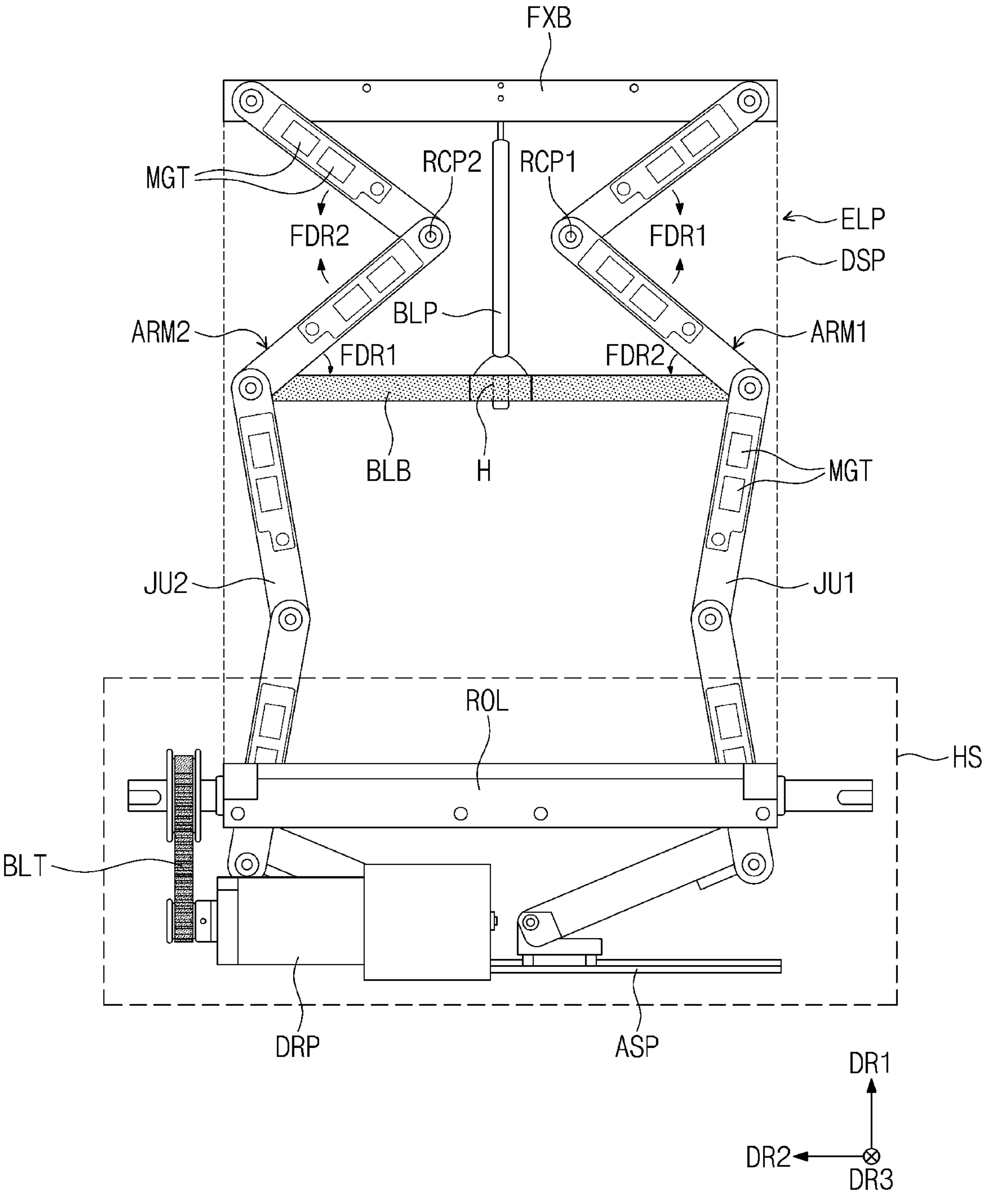
FIGS. 15 to 18 are schematic illustrations of a folding operation of first joint units and second joint units illustrated in FIG. 14.
Figure 16:
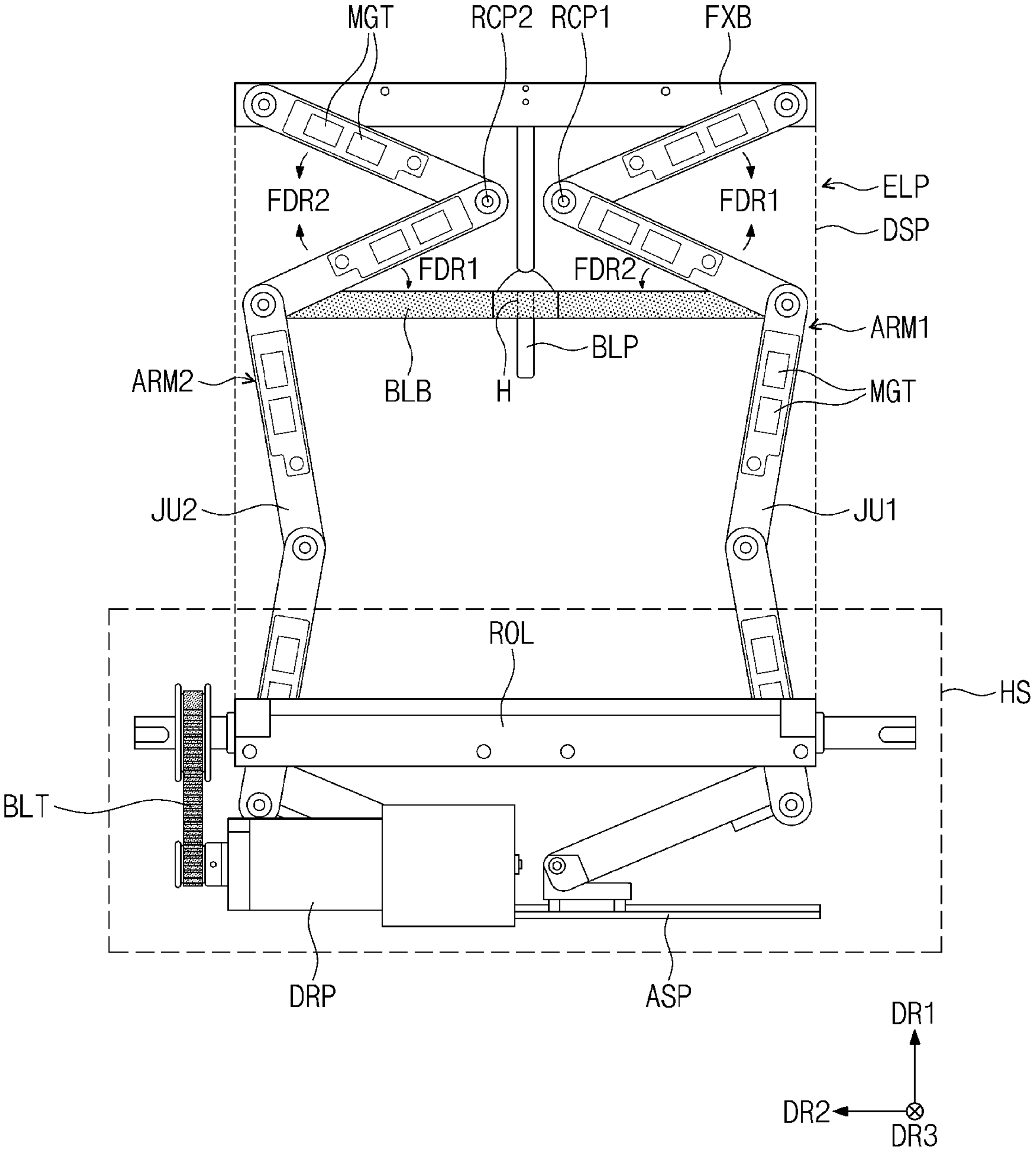
Figure 17:
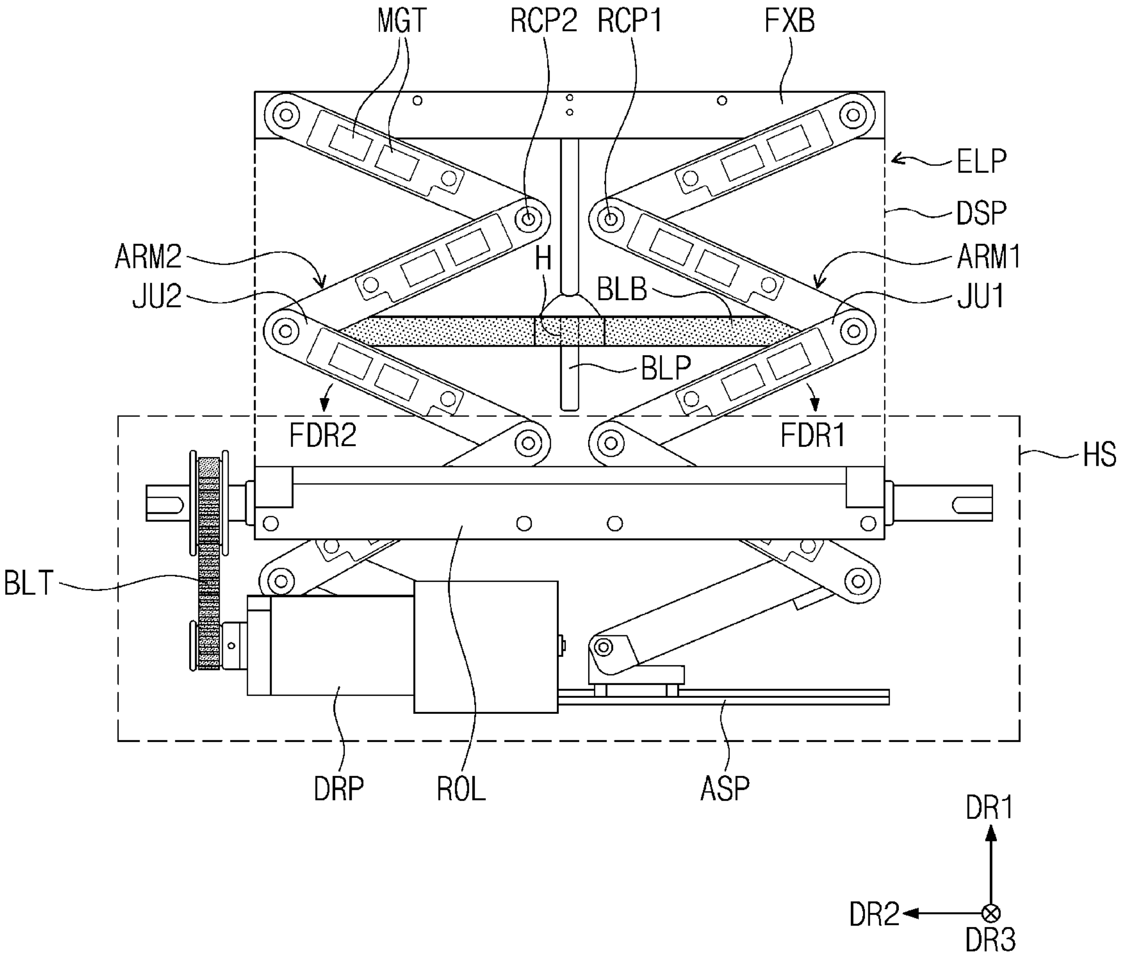

FIG. 14 is a view illustrating a front side of the elevator illustrated in FIG. 6. FIGS. 15 to 18 are schematic views illustrating a folding operation of the first joint units and the second joint units illustrated in FIG. 14.

FIG. 7 will be described below together with FIGS. 14 to 18 as needed. In FIGS. 14 to 18, to emphasize the configuration of the elevator ELP, the display DSP and the housing HS are illustrated by dotted lines.

Referring to FIGS. 7 and 14, the elevator ELP may include magnets MGT disposed in the first joint units JU1 and the second joint units JU2. At least one magnet MGT may be disposed in each of the first joint units JU1 and the second joint units JU2. Although FIG. 14 illustrates an example that two magnets MGT are disposed in each of the first joint units JU1 and the second joint units JU2, the number of magnets MGT disposed in each of the first joint units JU1 and the second joint units JU2 is not limited thereto.

To clearly illustrate the magnets MGT, the magnets MGT are illustrated in FIG. 14 to be visible together with the first joint units JU1 and the second joint units JU2. However, substantially, the magnets MGT may not be visible from the outside because the magnets MGT may be disposed inside the first joint units JU1 and the second joint units JU2.

Although the magnets MGT are disposed in the first joint units JU1 and the second joint units JU2, embodiments of the disclosure are not limited thereto. For example, the magnets MGT may be disposed on surfaces of the first joint units JU1 and the second joint units JU2 that face the display DSP.

When the display DSP is withdrawn outside the housing HS as illustrated in FIG. 6, the support bars SB of the display DSP illustrated in FIG. 9 may be attached to the magnets MGT, and the module support MSP may be attached to the first joint units JU1 and the second joint units JU2. Accordingly, the display DSP withdrawn outside the housing HS may be attached to the first joint units JU1 and the second joint units JU2 and may be extended to be flatter.

In an embodiment of the disclosure, the display DSP may be extended to be flat by the first joint units JU1 and the second joint units JU2 unfolded by the first torsion springs TSP1 and the second torsion springs TSP2, and the display DSP withdrawn outside the housing HS may be attached to the first joint units JU1 and the second joint units JU2 by the magnets MGT. Accordingly, the flatness of the display DSP exposed outside the housing HS may be improved.

Referring to FIGS. 7 and 14 to 18, the first joint units JU1 and the second joint units JU2 may be folded as the driving part DRP rotates with a rotational force greater than the elastic forces of the first torsion springs TSP1 and the second torsion springs TSP2 to wind the display DSP around the roller ROL.

Referring to FIGS. 15 to 18, the first joint units JU1 may be folded in a bellows style. For example, the first joint units JU1 may be continuously folded in the first folding direction FDR1 and the second folding direction FDR2.

The second joint units JU2 may be folded in a bellows style symmetrically to the first joint units JU1. For example, the second joint units JU2 may be continuously folded in the second folding direction FDR2 and the first folding direction FDR1.

The positions of the first rotational coupling portion RCP1 and the second rotational coupling portion RCP2 connected to the balance bar BLB may be maintained by the balance bar BLB. For example, when the first joint units JU1 and the second joint units JU2 are folded, the interval between the first rotational coupling portion RCP1 and the second rotational coupling portion RCP2 connected to the balance bar BLB in the second direction DR2 may be kept constant. The first rotational coupling portion RCP1 and the second rotational coupling portion RCP2 connected to the balance bar BLB may move in the first direction DR1 while maintaining the interval in the second direction DR2.

When the first joint units JU1 and the second joint units JU2 are folded, the balance post BLP may be retracted and moved in the first direction DR1. The balance post BLP may have a structure like that of an antenna and may be retracted in the first direction DR1. When the balance post BLP is retracted and moved in the first direction DR1, the balance post BLP may be moved through the hole H. The fixing bar FXB and the balance bar BLB may move toward the housing HS in the first direction DR1 while remaining parallel to each other through the balance post BLP.

Figure 18:
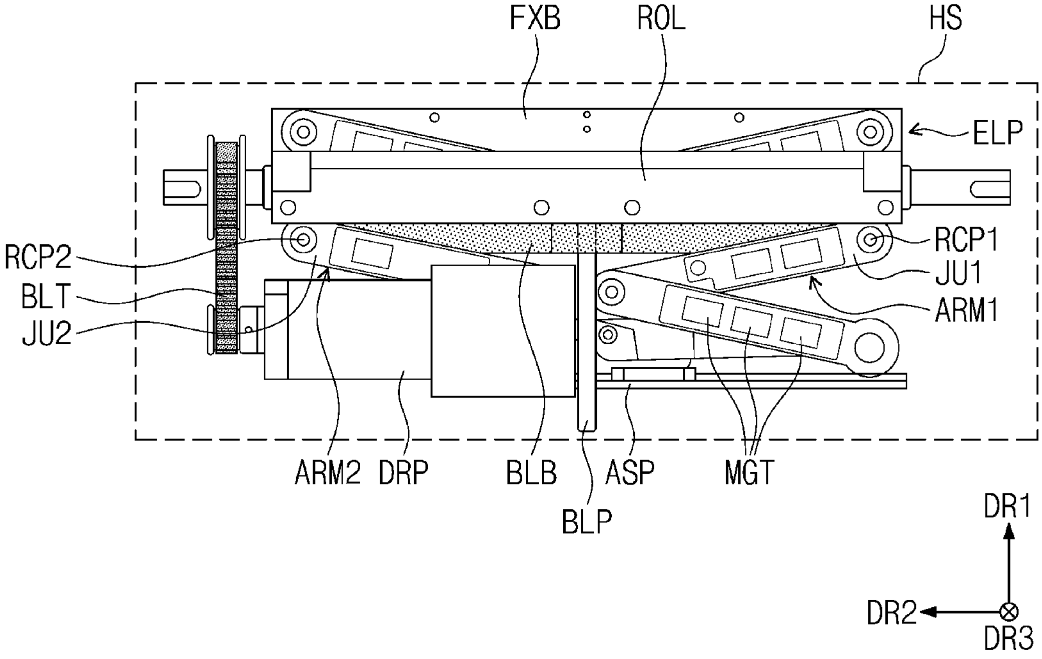

When the display DSP is consistently wound around the roller ROL, the first joint units JU1 and the second joint units JU2 may be folded and disposed inside the housing HS as illustrated in FIG. 18. Accordingly, the first arm ARM1, the second arm ARM2, the display DSP wound around the roller ROL, and the fixing bar FXB may be inserted into the housing HS and may be disposed inside the housing HS.

When the display DSP is unwound from the roller ROL, the first joint units JU1 and the second joint units JU2 may be extended in the first direction DR1 by the first torsion springs TSP1 and the second torsion springs TSP2 as illustrated in FIGS. 7 and 14. Accordingly, the display DSP, the fixing bar FXB, the first arm ARM1, and the second arm ARM2 may be extended and withdrawn outside the housing HS.

When the balance bar BLB and the balance post BLP are not used, the first joint units JU1 and the second joint units JU2 may not be folded or unfolded in equilibrium. For example, the first joint units JU1 may be folded at a larger angle than the second joint units JU2, or the first joint units JU1 may be folded at a smaller angle than the second joint units JU2. The first joint units JU1 may be unfolded with a larger angle than the second joint units JU2, or the first joint units JU1 may be unfolded at a smaller angle than the second joint units JU2.

The length of the first arm ARM1 and the length of the second arm ARM2 may differ from each other when the display DSP is wound around or unwound from the roller ROL. Accordingly, the display DSP may not be withdrawn from, or inserted into, the housing HS in equilibrium.

In an embodiment of the disclosure, the positions of the first rotational coupling portion RCP1 and the second rotational coupling portion RCP2 disposed in specific positions may be fixed by the balance bar BLB in the second direction DR2. Furthermore, the balance bar BLB and the fixing bar FXB may be connected by the balance post BLP and may move in the first direction DR1 while remaining parallel to each other.

Because of the balance bar BLB and the fixing bar FXB maintained in parallel, the first joint units JU1 and the second joint units JU2 may be folded or unfolded in equilibrium. Accordingly, the display DSP may be withdrawn from, or inserted into, the housing HS in equilibrium.

Figure 19:
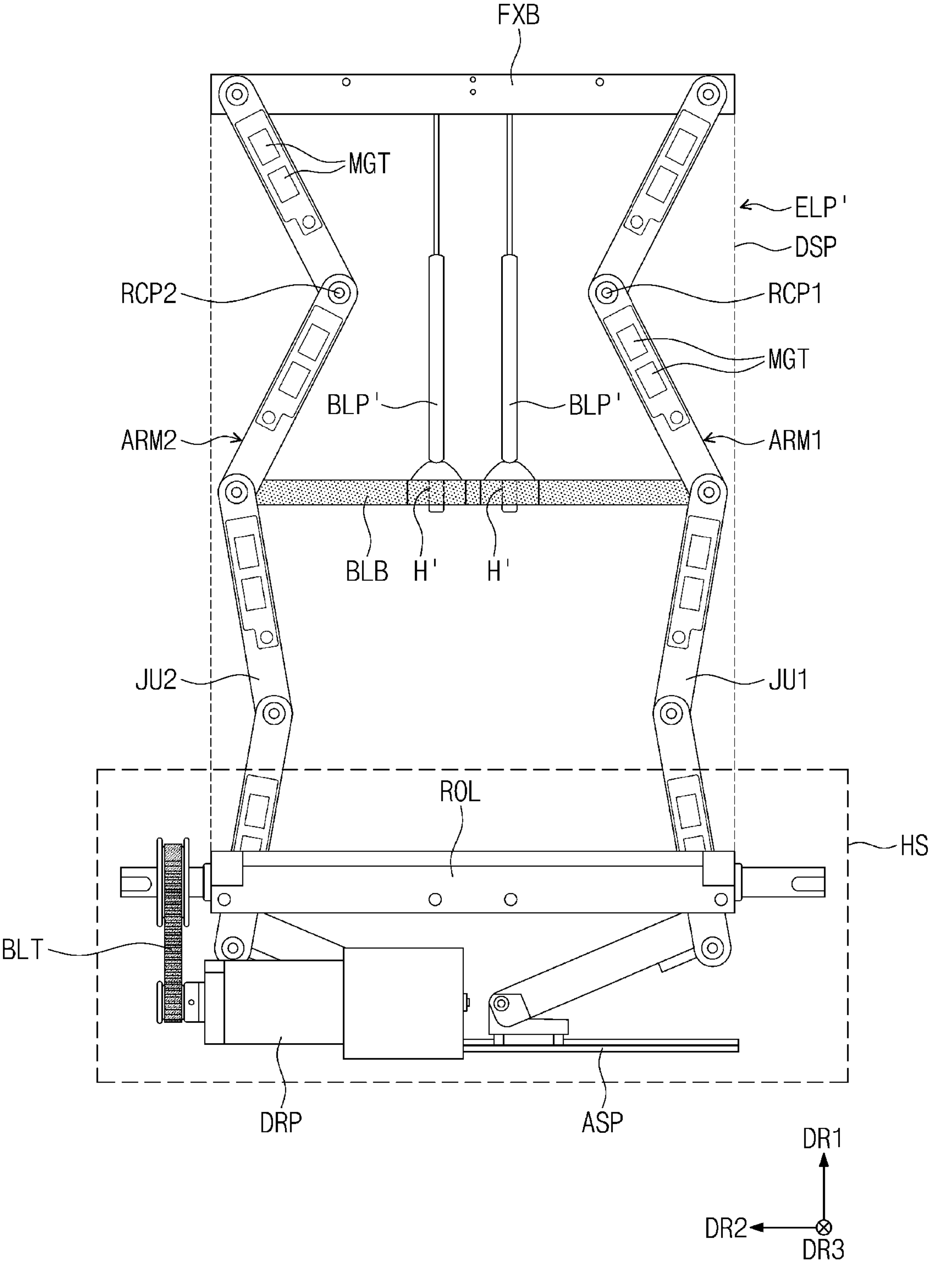
FIG. 19 is a schematic illustration of an elevator according to an embodiment of the disclosure.

FIG. 19 is a view illustrating an elevator according to an embodiment of the disclosure.

Referring to FIG. 19, multiple balance posts BLP' may be disposed between a fixing bar FXB and a balance bar BLB and may be connected to the fixing bar FXB and the balance bar BLB. The balance bar BLB may include holes H' overlapping the balance posts BLP'. The balance posts BLP' may have substantially the same configuration as the single balance post BLP described above.

The elevator ELP' illustrated in FIG. 19 may have the same configuration as the elevator ELP illustrated in FIG. 14, except that the elevator ELP' includes multiple balance posts BLP'.

Because multiple balance posts BLP' are connected to the fixing bar FXB and the balance bar BLB, fixing bar FXB and the balance bar BLB may be better maintained to be parallel to each other.

According to the embodiments of the disclosure, when the display module wound around the roller is unwound from the roller, the module support supporting the display module may be attached to the magnets of the lifting member, thereby improving the flatness of the display module.

When the display module is wound around or unwound from the roller, the display module may be withdrawn from or inserted into the housing in equilibrium by the balance bar and the balance post of the lifting member.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:

a display module;

a roller connected to a first end of the display module; and a first arm and a second arm disposed on a rear surface of the display module, spaced apart from each other, and connected to a second end of the display module, the first end of the display module and the second end of the display module are opposite to each other in a first direction;

a fixing bar connected to the first arm, the second arm, and the second end of the display module, the fixing bar extending in a second direction intersecting the first direction, a balance bar disposed between the first arm and the second arm, the balance bar extending in the second direction and configured to move in the first direction relative to the first end of the display module in response to the display module being rolled or unrolled; and a balance post disposed between the balance bar and the fixing bar, the balance post extending in the first direction and connected to the balance bar and the fixing bar, wherein each of the first arm and the second arm includes:

joint units coupled to each other and rotatable relative to each other; and a torsion spring disposed in a portion of adjacent ones of the joint units, and the balance bar connects to the first arm at a first rotational coupling portion of the first arm, connects to the second arm at a second rotational coupling portion of the second arm, and maintains a fixed distance between the first rotational coupling portion and the second rotational coupling portion.

2. The display device of claim 1, wherein the joint units are unfolded or folded in the first direction.

3. The display device of claim 2, wherein the torsion spring applies forces to the joint units such that the joint units are unfolded in the first direction.

4. The display device of claim 2, wherein each of the first arm and the second arm includes:

rotational coupling portions that rotatably couple the joint units to each other, and the torsion spring surrounds and is coupled to at least one of the rotational coupling portions.

5. The display device of claim 4, wherein the torsion spring includes:

a spring part surrounding the at least one of the rotational coupling portions, the spring part having a helical shape; and an extension portion extending from the spring part toward each of the joint units coupled to the at least one of the rotational coupling portions.

6. The display device of claim 2, wherein each of the first arm and the second arm further includes another portion of adjacent ones of the joint units, and the balance bar is connected to the another portion of adjacent ones of the joint units.

7. The display device of claim 6, wherein the torsion spring is not disposed in the another portion of adjacent ones of the joint units.

8. The display device of claim 2, wherein the balance bar includes a hole through which the balance post moves in the first direction.

9. The display device of claim 2, wherein the balance post is extended and retracted in the first direction.

10. The display device of claim 2, further comprising:

a support layer disposed on the rear surface of the display module; and a support bar disposed in the support layer.

11. The display device of claim 10, wherein a modulus of the support bar is higher than a modulus of the support layer.

12. The display device of claim 10, wherein the support bar includes metal.

13. The display device of claim 12, further comprising:

at least one magnet disposed in each of the joint units.

14. The display device of claim 2, further comprising:

a driving part that rotates with respect to an axis parallel to a second direction intersecting the first direction; and a belt connecting the driving part to the roller.

15. The display device of claim 14, wherein the display module is wound around or unwound from the roller as the driving part rotates, and a rotational force of the driving part is greater than an elastic force of the torsion spring when the driving part rotates such that the display module is wound around the roller.

16. The display device of claim 1, further comprising:

a housing in which the roller, the display module, the first arm, and the second arm are disposed, wherein the display module, the first arm, and the second arm extend to an outside of the housing in case that the display module is unwound from the roller.

17. A display device comprising:

a display module;

a roller connected to a first end of the display module, the display module being wound around or unwound from the roller;

a fixing bar spaced apart from the roller in a first direction and connected to a second end of the display module, the first end of the display module and the second end of the display module being opposite to each other in a first direction;

first joint units disposed on a rear surface of the display module and connected to the fixing bar, the first joint units being folded or unfolded in the first direction;

second joint units disposed on the rear surface of the display module and connected to the fixing bar, the second joint units being folded or unfolded in the first direction and spaced apart from the first joint units in a second direction intersecting the first direction;

a balance bar disposed between the first joint units and the second joint units, wherein the balance bar extends in the second direction and is configured to move in the first direction relative to the first end of the display module in response to the display module being rolled or unrolled; and a balance post disposed between the fixing bar and the balance bar, the balance post extending in the first direction and connected to the balance bar and the fixing bar, wherein the balance bar includes a hole overlapping the balance post, the balance bar connects to the first arm at a first rotational coupling portion of the first arm, connects to the second arm at a second rotational coupling portion of the second arm, and maintains a fixed distance between the first rotational coupling portion and the second rotational coupling portion, the first rotational coupling portion is disposed at a distal end of the first joint units, and the second rotational coupling portion is disposed at a distal end of the second joint units of the first arm.

18. The display device of claim 17, further comprising:

torsion springs disposed in the first joint units and the second joint units, wherein the torsion springs apply forces to the first joint units and the second joint units such that the first joint units and the second joint units are unfolded.

19. An electronic device, comprising:

a display module;

a roller connected to a first end of the display module; and a first arm and a second arm disposed on a rear surface of the display module, spaced apart from each other, and connected to a second end of the display module, the first end of the display module and the second end of the display module are opposite to each other in a first direction;

a fixing bar connected to the first arm, the second arm, and the second end of the display module, the fixing bar extending in a second direction intersecting the first direction;

a balance bar disposed between the first arm and the second arm, the balance bar extending in the second direction and configured to move in the first direction relative to the first end of the display module in response to the display module being rolled or unrolled; and a balance post disposed between the balance bar and the fixing bar, the balance post extending in the first direction and connected to the balance bar and the fixing bar, wherein each of the first arm and the second arm includes:

joint units coupled to each other and rotatable relative to each other; and a torsion spring disposed in a portion of adjacent ones of the joint units, and the balance bar connects to the first arm at a first rotational coupling portion of the first arm, connects to the second arm at a second rotational coupling portion of the second arm, and maintains a fixed distance between the first rotational coupling portion and the second rotational coupling portion.

* * * * *